United States Patent [19]
Mutsuura et al.

[11] Patent Number: 5,449,030
[45] Date of Patent: Sep. 12, 1995

[54] METHODS AND APPARATUS FOR CENTERING A LOG AND FOR SUPPLYING A LOG TO BE CENTERED

[75] Inventors: Tetsutaro Mutsuura, Aichi; Noriyuki Tsukashita, Komaki; Soichi Hashimoto, Nagoya; Masanori Murakami, Komaki; Yoshifumi Isogawa, Kasugai; Koichi Oji, Nagoya, all of Japan

[73] Assignee: Kubsuhikikaisha Taiheiseisakusho, Komaki, Japan

[21] Appl. No.: 168,369

[22] Filed: Dec. 17, 1993

[30] Foreign Application Priority Data

Dec. 22, 1992 [JP] Japan .................. 4-362152
Dec. 7, 1993 [JP] Japan .................. 5-340486

[51] Int. Cl.$^6$ .............. B27L 5/02; B27B 1/00
[52] U.S. Cl. ................ 144/357; 144/209 A; 144/365; 356/386; 364/474.09
[58] Field of Search ......... 82/124; 144/209 R, 209 A, 144/357, 365; 356/384, 385, 386, 387; 250/560; 364/474.09, 474.34, 559

[56] References Cited

U.S. PATENT DOCUMENTS

| | | | |
|---|---|---|---|
| 3,902,539 | 9/1975 | Ketteler | 144/209 A |
| 4,197,888 | 4/1980 | McGee et al. | 144/209 A |
| 4,246,940 | 1/1981 | Edwards et al. | 144/209 A |
| 4,383,560 | 5/1983 | McGee | 144/209 A |
| 4,384,601 | 5/1983 | Richert | 144/209 A |
| 4,397,343 | 8/1983 | Fields | 144/357 |
| 4,965,734 | 10/1990 | Edwards et al. | 144/209 A |

FOREIGN PATENT DOCUMENTS

5854003 12/1976 Japan .
438283 7/1987 Japan .

*Primary Examiner*—W. Donald Bray
*Attorney, Agent, or Firm*—Ronald R. Snider

[57] ABSTRACT

Periphery detectors are arranged being juxtaposed closely, along the longitudinal direction of the log which is to be rotated one revolution around a virtual center, thereby a plurality of peripheries of cross sections along the longitudinal direction are detected for the log. The direction of the largest right circular cylinder is determined according to the largest inscribed circles for the peripheries of three cross sections (i.e., the ones adjacent to both the ends of the log and the one in the middle of the log) and the largest right circular cylinder itself is determined according to the peripheries of all cross sections detected. Thus the center line of said largest right circular cylinder is adopted as the turning center. The positions of a pair of inclined beams or swing arms are adjusted for canceling the deviation between the turning center and the virtual center. Furthermore, the largest radius of the long rotation around the turning center is determined from all said cross sections detected, and then the planer table is located in the stand in a position where the planar table never invades said largest radius of log rotation.

17 Claims, 22 Drawing Sheets

METHODS AND APPARATUS FOR CENTERING A LOG AND FOR SUPPLYING A LOG TO BE CENTERED

FIELD OF INVENTION

The present invention relates to methods and apparatus for improving accuracy in determining the turning center of a log when the log is shaved by rotation (i.e., turned), and for keeping the planer table of a veneer lathe standing by at an optimal position for allowing the start of turning according to the diameter of the log when the turning center of the log is determined, and further, those for supplying the log, which has already been centered, to the spindle chuck of the veneer lathe.

BACKGROUND OF THE INVENTION

In the prior arts for turning a log by means of a veneer lathe, the turning center on each end of the log is held by a spindle chuck which can move freely back and forth to both wood end faces of the log, and then, the planer table is fed in accordance with the rotation of the spindle for producing an elementary sheet of plywood (which will be designated as an elementary sheet hereinafter). The step for centering a log should be done prior to the turning step for making the elementary sheet. The log for which the turning center has already been determined is supplied to the spindle position in the veneer lathe.

With respect to this sort of process for centering logs, the present applicant filed a Japanese Patent Application No. 295804/85 on Dec. 26, 1985, entitled "A Method and Apparatus for Centering Logs", which is incorporated here in by reference. The makeup of the invention described above comprises a pair of spindles which are arranged on the left and right sides movably in the horizontal direction. Holding claws are mounted on the tips of the spindles, and rotation angle detectors are installed in the neighborhood of the basal ends of the respective spindles.

On the other hand, a travelling body is supported which is able to travel under the guidance of the horizontal beam on the upper portion of the machine frame. Transportation claws are mounted on the travelling body enabling reciprocating and up/down motions by means of a device for x-axis adjustment or y-axis adjustment, respectively, which is suspended from each side of the travelling body. Furthermore, a plurality of rocking arms are provided while spaced arbitrarily in the longitudinal direction of the log. Each rocking arm is mounted to be able to rock, and a detector for detecting the amount of displacement is attached to each basal end thereof. When the log is rotated around a virtual center with a rough accuracy by a pair of holding claws described above, the coordinates of the turning center are calculated by both the data from the rotation angle detectors and the data from the detectors for detecting the amount of displacement. According to the resulting coordinates, the amount of adjustment in the lateral direction and that in the downward direction are sent to the device of x-axis adjustment and that of y-axis adjustment, respectively.

In this process for centering a log, first of all, the turning center has been determined from the data of cross-sectional peripheries, having centers on the virtual center axis and being perpendicular thereto, with respect to 3 cross sections (i.e., those adjacent to both the ends of the log and in the middle of the log) or 5 cross sections including additional 2 ones besides the said 3 ones in case of a longer log.

Secondly, both the amounts of X-directional and Y-directional adjustment upon the position of turning center which are obtained by using the log-centering apparatus are transmitted to the transportation claws which are placed between the log-centering apparatus and the spindle position in the veneer lathe. While the log held by these transportation claws is carried to the spindle position, each adjustment is completed according to said amount of adjustment. At the same time, the position of the planer table of the veneer lathe on the feeding shaft is controlled with reference to the maximum radius with respect to the turning center of the log determined from each of the data. Thus the impact between the blade of the planer table and the log can be avoided, and the planer table can stand by at a position ready to shave the log immediately, when the log is attached to the spindle chuck.

As is basically disclosed in Japanese Patent Publication No. 54003-1983, the method for controlling the position of the planer table is instituted so that the largest diameter of the log and the position of the planer table are both detected and the amount of movement of the planer table is controlled according to the data obtained. Thus the log is set to the spindle chuck while the planer table is kept waiting at a predetermined position.

The largest radius of the log, which has already been set to the spindle chuck, is determined from 3 cross sections arranged in the longitudinal direction of the log (i.e., those adjacent to both the ends of the log, or 5 cross sections further including two ones besides the said three ones in case of a longer log). Under the presence of the cut marks of branches or convex portions such as galls between the cross sections, the maximum radius obtained from the data is, however, to be underestimated. Therefore, the maximum permissible amount of the convex portions, which exists in the interval of each cross section calculated from data, is preliminarily taken into account and added to the maximum radius obtained by the method described above for determining the stand by position of the planing table on the feeding axis. Thereby a collision between the log and the planer table can be avoided when the log is set to the spindle chuck, and the log is ready to be shaved immediately.

Thirdly, both X-directional and Y-directional turning center adjusting amounts obtained by using the log-centering apparatus are transmitted to the transportation claws located between the log-centering apparatus and the spindle position in the veneer lathe. While the log held by the transportation claws is carried to the spindle position, respective adjustments with said amount obtained are completed, thereby the time needed for centering and setting the log can be saved.

In the first technique described above, however, logs to be processed usually have somehow bending and twisting in the longitudinal direction of the log, cut marks of branches, convex portions of galls, and further, concave portions, such as knot holes and marks due to the removal of cans. If these things exist within each space with respect to the data needed for centering the log, the accuracy of centering decreases significantly.

In the second technique, several effects are expected unless the convex portion existing in each space between the cross section in the log exceeds the maximum permissible amount in the makeup described above. In a case where the convex portion exceeds the maximum permissible amount, such a concave portion may collide with the planer table when the log is set to the spindle chuck, resulting in a breakage of the planer table. In the opposite case (i.e., no concave portion existing within each space of the cross sections of the log) the part of the maximum permissible amount newly added will become an extra space between the log set to the spindle chuck and the blade of the planer table. Therefore, the planer table is to be fed idly until the planer table reaches the position where the turning of the log is started. During this period no elementary wood is shaved out so that the production efficiency may decrease.

In the third technique, a certain degree of effect can be expected only when the horizontal space between the device for centering a log and the spindle of the veneer lathe is so open that no attachment on either device intervenes therein in the constitution described above. In cases where attachments intervene in this space, said attachments would become obstacles against the log as well as the transportation claws using on the horizontal beam in the upper portion of the machine frame as a guide. For example, in some cases, when pushing the blade of the planer table against the log for turning, a backup roller unit for receiving the pressure from the blade is mounted on the opposite side of the blade with respect to the log, and this prevents the log from deforming due to the pressure from the blade. This backup roller unit is usually placed between the device for centering a log and the spindle of the veneer lathe such that this becomes a hindrance for transporting the log.

SUMMARY OF THE INVENTION

The first object of this invention is to increase an accuracy in centering log and to provide a centering technique wherein the calculation for the centering is performed efficiently.

The second object of the invention is to provide such a technique as to start the turning of a log immediately while avoiding any collision between the blade on the planer table and the log, and without allowing any extra distance between the blade and the log prior to the start of the turning of the log when the planer table is held at the stand by position.

The third object of the invention is to provide such a technique as to make it possible to supply the log, for which the centering process has been completed, to the veneer lathe spindle while avoiding any interference with its attachments, even under the presence of attachments such as backup rollers, and so on, within the space between the apparatus for centering the log and the veneer lathe spindle.

The means to solve the first object of this invention is the construction;

(1) wherein a plurality of contact or non-contact type of detecting elements, which cover detecting regions juxtaposed closely over the total length of the log, are corresponded to the outer surface of the log;
(2) wherein the peripheries of cross sections for respective said detecting regions are detected by rotating said log around a virtual (or temporary) center;
(3) wherein the largest circles inscribed in the peripheries of two cross sections adjacent to both the ends of said log or of three cross sections further comprising the third cross section located in the middle of said log besides said two ones are obtained;
(4) wherein the direction of the largest right circular cylinder with respect to the longitudinal direction of said log is forecasted from the geometrical arrangement of said largest inscribed circles and;
(5) wherein the center of the largest right circular cylinder, which is settled inside all cross sections obtained for respective said detecting regions, is determined according to said forecasted direction, thereby said center determined is adopted as the anticipated center.

For determining the center line of such largest right circular cylinder, besides the method wherein the data of the peripheries of cross sections from all said detecting regions are processed simultaneously thereby determining the largest right circular cylinder inscribed therein at once, this invention comprises conceptually the method using a virtual largest fight circular cylinder. That is to say, a virtual largest right circular cylinder (which is settled inside the largest circles inscribed in the peripheries of two cross sections adjacent to both the ends or of three cross sections further comprising the one located in the middle of said log obtained) is once obtained. After that it is judged whether the rest of the peripheries of cross sections located between said two or three cross sections invade said virtual largest right circular cylinder. If they invade said virtual cylinder, a new largest right circular cylinder is determined so that the invasion is settled, and, if not, said virtual cylinder is adopted as the largest right circular cylinder anticipated.

According to the invention mentioned above, in any case, the peripheries of cross sections are detected at a high population along the longitudinal direction by means of a plurality of detecting elements closely arranged over the total length of the log. Of these peripheries of cross sections which are effective for forecasting the shape of the log, the peripheries of two cross sections adjacent to both the ends or of three cross sections further comprising the one located in the middle of said log are used for forecasting the direction of the largest right circular cylinder while the data of peripheries for all cross sections are used for determining the center line of the largest right circular cylinder. By using the data of respective cross sections properly, the centering of a log is performed efficiently and precisely.

For such a plurality of periphery-detecting elements for obtaining respective peripheries of cross sections of the log, the construction comprises a plurality of rocking arms, which are arranged in the longitudinal direction of the log so that the respective arms contact with the outer surface of the log. In a case for treating a log with a shorter length, one or more specific rocking arms located at the end (s) of the series of said rocking arms is (are) mounted movably in the longitudinal direction of the log, and arbitrary rocking arms except for said specific one(s) are withdrawn from the series of the detecting juxtaposed elements, and wherein said specific rocking arm(s) is (are) shifted to the position close to the middle. Besides such contact type detectors, non-contact type detectors using the reflection or insulation by the outer surface of the log of propagating medium, such as laser beam, electromagnetic wave and ultrasonic wave, and so on, are also used for said plurality of the periphery detectors.

For detecting peripheries of the cross sections when the displacement of the detector is obtained as a function of time, the data can be obtained as a time—displacement function from the rotation of the log when the rotation reaches to a uniform rate after several revolutions. On the other hand, when obtaining the data by only rotating the log one revolution, a rotation angle detector is preferably used for obtaining the data of displacement as a function of the rotation angle with respect to the peripheries of cross sections of the log since the angular velocity of the rotation changes due to the respective positive and negative angular accelerations at the beginning and end of the rotation. Although a rotation angle detector is needed in this case, the detection of the peripheries of cross sections can be performed quickly by a minimum rotation.

For solving the second object of the invention, the log is rotated around a virtual center, respective peripheries of the cross sections are detected for the detecting regions juxtaposed closely over the total length of the log, and the turning center is determined from the data of peripheries of more than two cross sections thereof. After that, the largest radius for the rotation of the log with respect to said turning center is determined according to the data of peripheries of all cross sections. The planer table of the veneer lathe is held at the optimum stand by position corresponding to the largest radius of rotation. Therefore, the largest radius for the rotation of the log is determined with no undetected region appearing on the log over the length thereof, and the result of the determination is fed back to the stand by position of the planer table. This solves such problems as a collision between the log, which is supplied to the turning center position of the veneer lathe (such as spindle chuck); and the blade of the planer table, or as a idly time prior to the start of turning due to the excess distance between the blade and the log.

For solving the third object, the invention comprises guide beam members, such as inclined beam members, or extendable and retractable swing members, and so on, for supplying a log with no interference with attachments such as said backup roller device between the log centering apparatus and the turning center position of the veneer lathe. In case of guide beam members, such as inclined beam members, the passage of the log transportation is set up so that an interference with said attachments located in the middle position is avoided. On the other hand, the swing members are mounted so that the passage of swinging never interferes with said attachments. Particularly when using extendable and retractable swing members, avoiding such interferences is further eased by the extension and retraction of the swing members. In both cases, the members are mounted in a pair facing each other with respect to the log along the longitudinal direction thereof, and claws for independently movable transportation are mounted on respective members. Thus these claws can be located in arbitrary positions required for the adjustment of the turning center for the log.

Therefore, in comparison with the case of integrated gate type guide members or swing members, only a small force is required for driving the members, and the size of the mechanism can be reduced. Furthermore, the adjustment of the turning center can be performed more precisely than when both members are integrated, since the positions of the transportation claws on both sides can be adjusted independently.

DETAILED DESCRIPTION OF THE PREFERABLE EMBODIMENTS

Several embodiments of this invention will now be described with reference to drawings.

Figure 1:
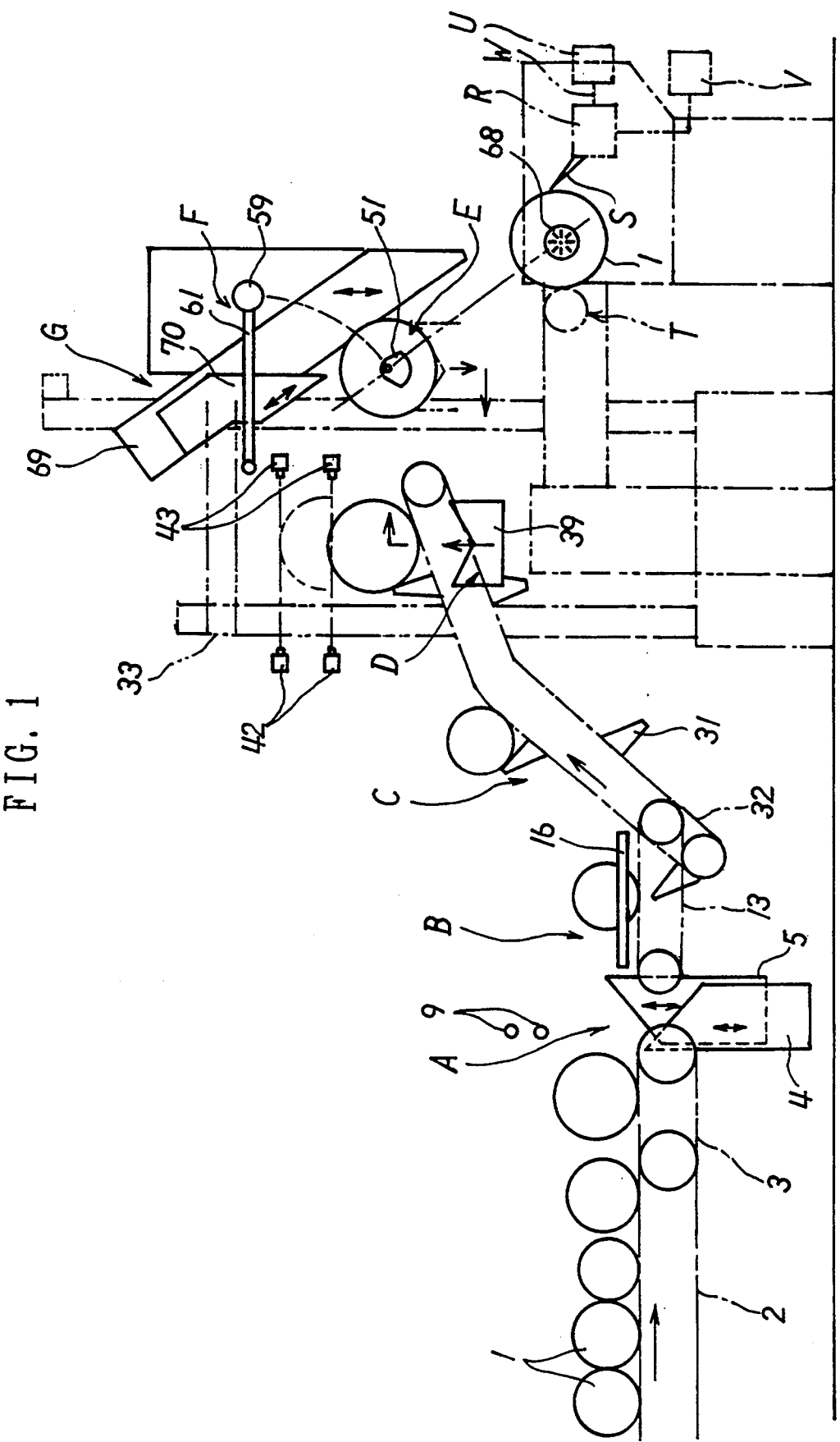
FIG. 1 is a schematic representation explaining the motion of the whole of a preferable embodiment of this invention.
Figure 4:
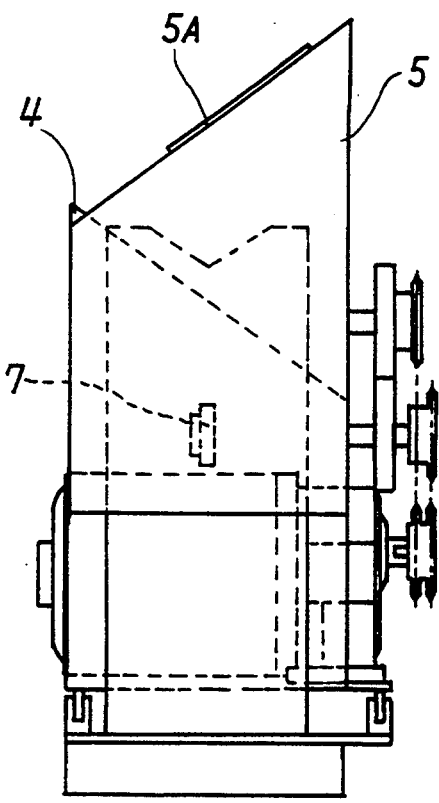
FIG. 4 is a partial side view of FIG. 1 enlarging the part A.
Figure 5:
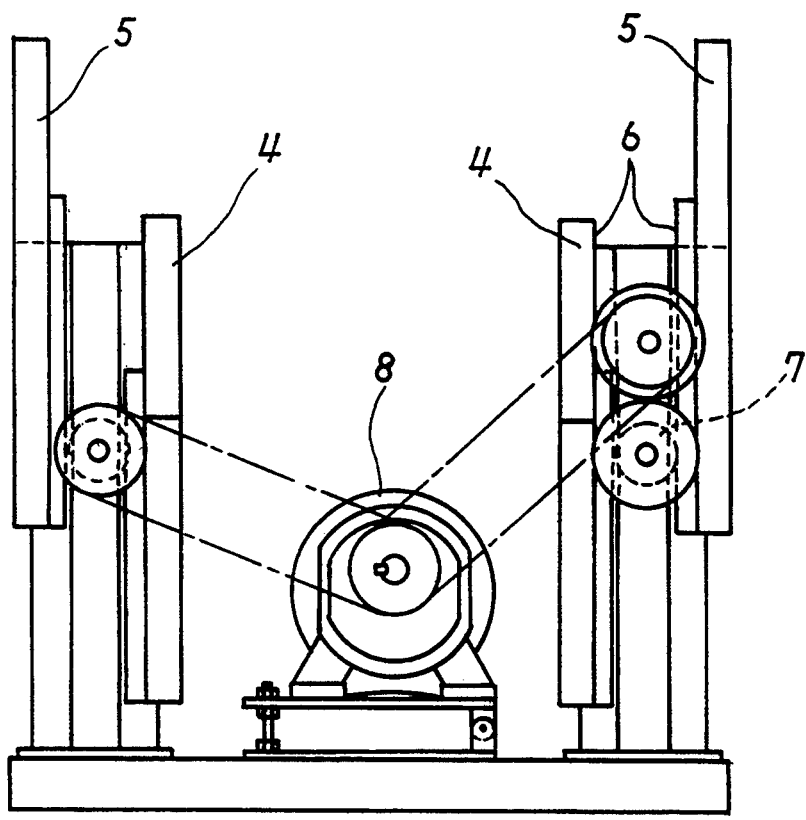
FIG. 5 is a front view of FIG. 4.

As is shown in FIG. 1, an intermediary conveyor 3 is connected to the end of a log conveyor 2 for transporting a log 1. The first receiving frame 4 and the second receiving frame are mounted being adjacent each other near the end of said intermediary conveyor 3. The first receiving frame 4 has a vertical back end, and its upper surface has a downward slope in the direction of log travel. The upper surface of the second receiving frame 5 has a upward slope in the direction of log travel and is equipped with a log detector 5A (such as a proximity switch, limit switch, reed switch, and so on) (FIG. 2 and FIG. 4), mounted elastically through a spring which is not presented in the figures. The first receiving frame 4 and the second receiving frame 5 are paired to each other, and two such pairs are installed at a designated distance. As is shown in FIG. 5, a pinion gear 7 is engaged between racks 6 mounted on the surface of respective receiving flames 4 and 5, which are facing each other. In each pair, a common motor 8 moves the first receiving frame 4 and the second receiving frame 5 up or down in directions opposite each other, respectively.

As is shown in FIG. 1, detectors of log diameter 9 comprising photo-cells or proximity switches, and so on, are arranged on the side of the log sending its position in order to judge whether the log transported from the prior step is fit for the next step, namely, the centering step from the diameter of the log, where the operation and stopping for the log conveyor 2 and intermediary conveyor 3 are controlled.

Figure 6:
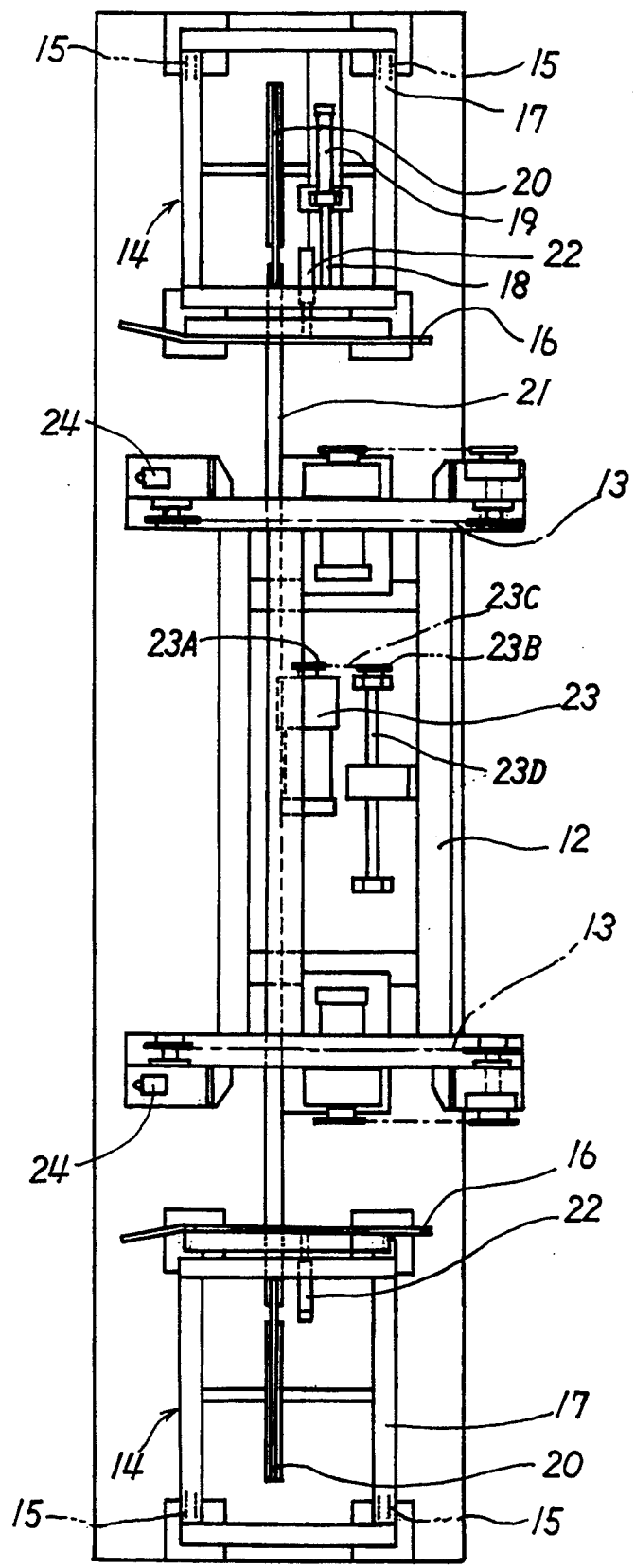
FIG. 6 is a partial elevation of FIG. 1 enlarging the part B.
Figure 7:
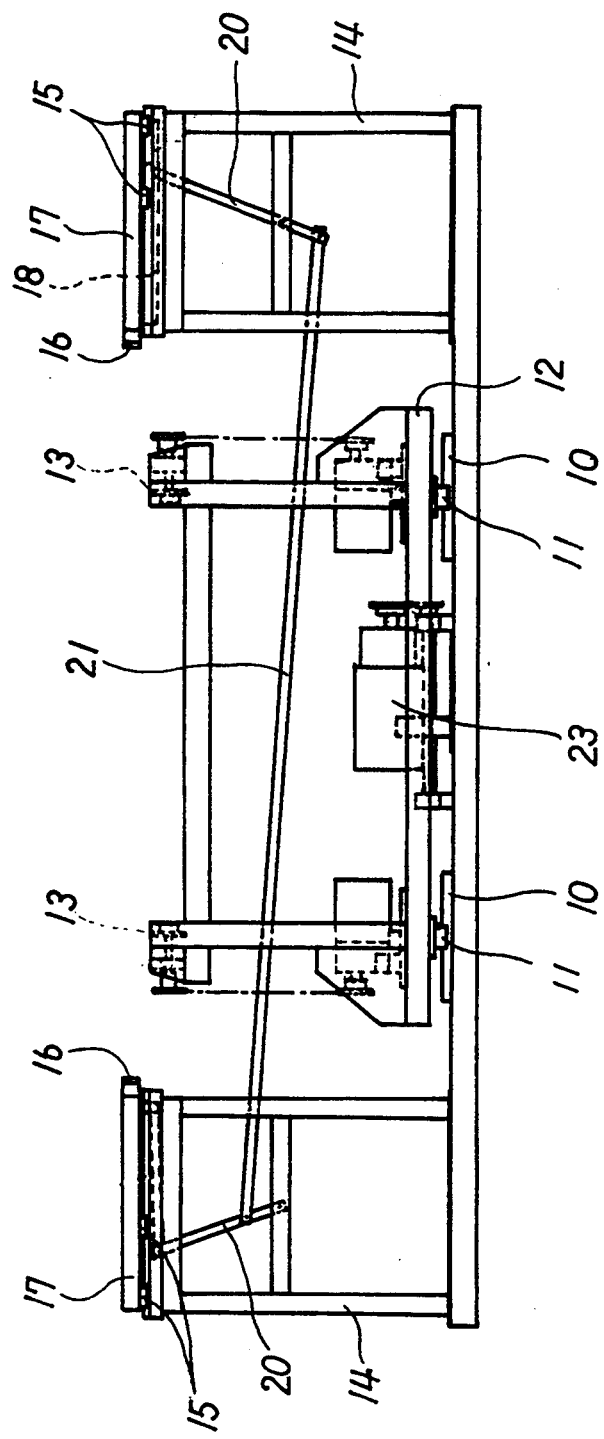
FIG. 7 is a front view of FIG. 6.

As is shown in FIG. 7, guides 10 such as slide rails, linear way, and so on (which items are generally called 'guide' hereinafter), are laid adjacent to the log sending position. A shifting table 12, on which linear blocks 11 are mounted on the four comers, is installed on said respective guides 10 movably in the direction perpendicular to that of the transportation of the log 1, and a pair of delivery conveyors 13 are mounted on both side ends of the shifting table 12. A threaded feeding shaft 23D (FIG. 4) is connected with a motor 23 through sprockets 23A and 23B. A chain 23C in FIG. 6, is screwed on the shifting table 12, and the shifting table is moved to the left or to the fight by the motor 23.

A pair of support frames 14 are arranged on both sides of the shifting table 12. Sliders 17 of equipped with contactors 16 on their respective fore ends are movably mounted through guide 15 in the direction of transportation of the log 1. The tip of a piston rod of the cylinder 18 (FIG. 6), is mounted on the support frame 14, and is connected with said each slider 17. The lower part of a link 20 (FIG. 7) is connected with one slider 17, and is further connected with the middle part of the link 20 for the other slider 17 by a connecting bar 21, thereby a pair of contactors 16 move to and from each other in the direction of the travel.

As is shown FIG. 6, cylinders 22 for detecting the contact of said contactors 16 with the end surfaces of the log are mounted behind respective contactors 16, and an encoder, which is not presented in the figure, is built in each cylinder 18 for providing thereto a function of measuring the length of the log Furthermore, a pair of log end detectors 24, for detecting the end portions of the log 1, are mounted in the neighborhood of the fore end of said pair of delivery conveyors 13. When the position of the log 1 is shifted in its longitudinal direction, both of the log end detectors 24 rotate in the normal or the reverse direction, and the slider 12 is slid in the direction perpendicular to that of the transportation of the log 1 until the log end detectors 24 detect both end portions of the log 1. Respective sliders 17 equipped with said contactors 16 output driving or stopping signals to said motor 23 by detecting the end surface of the log 1. This takes back the log 1 and slider 12 to the central position.

Figure 3:
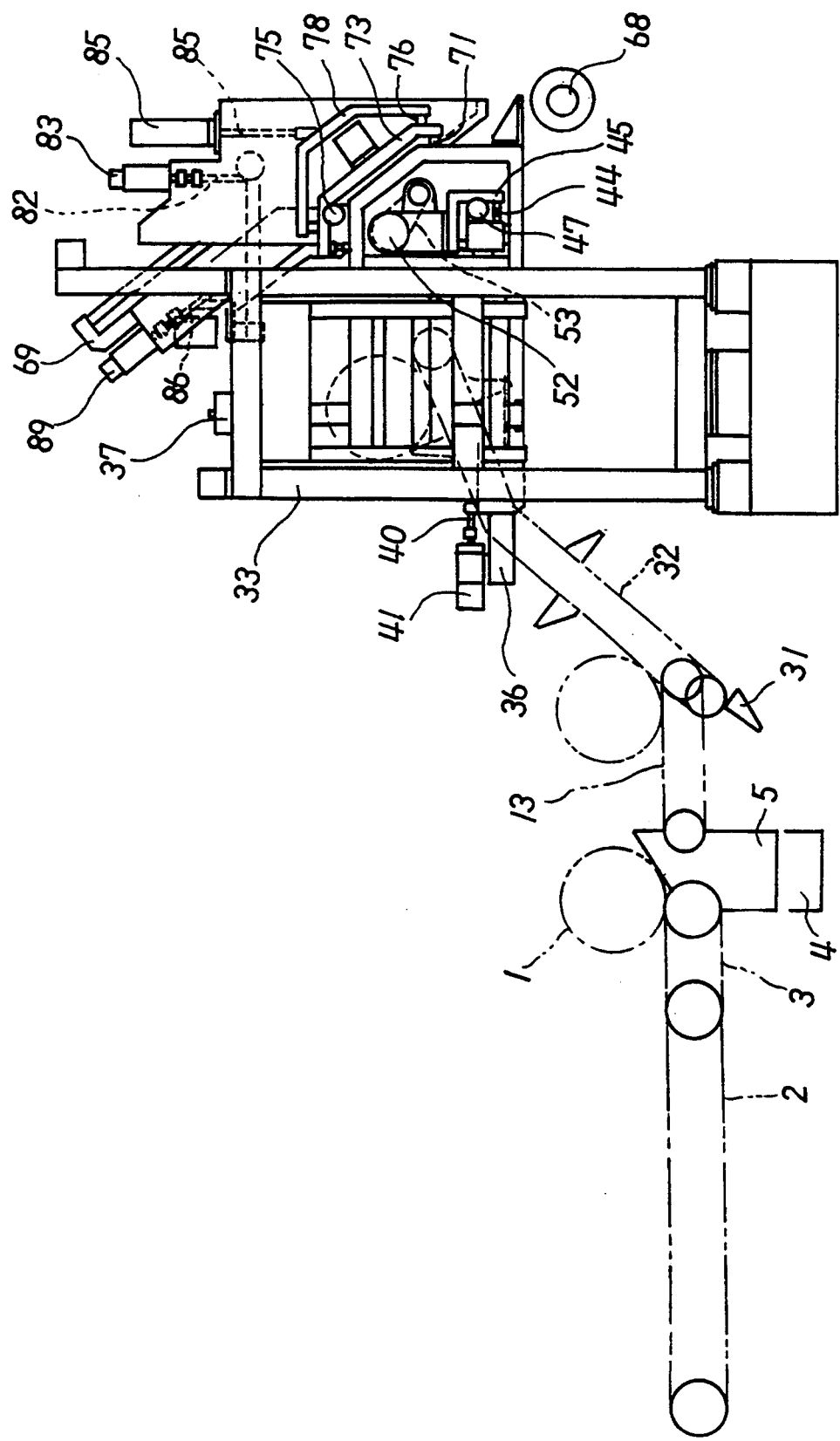
FIG. 3 is a side view of FIG. 2.
Figure 8:
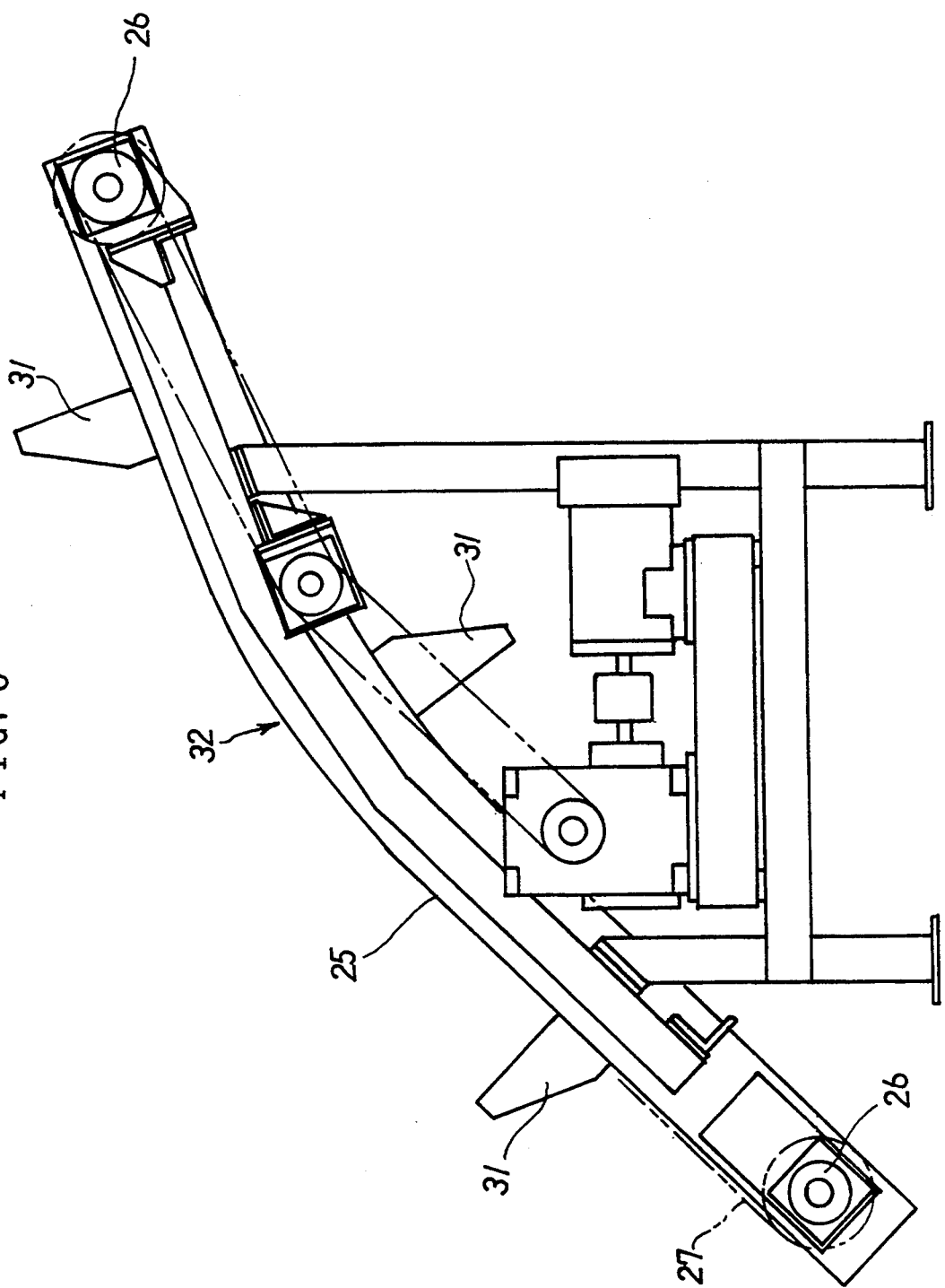
FIG. 8 is a partial side view of FIG. 1 enlarging the part C.
Figure 9:
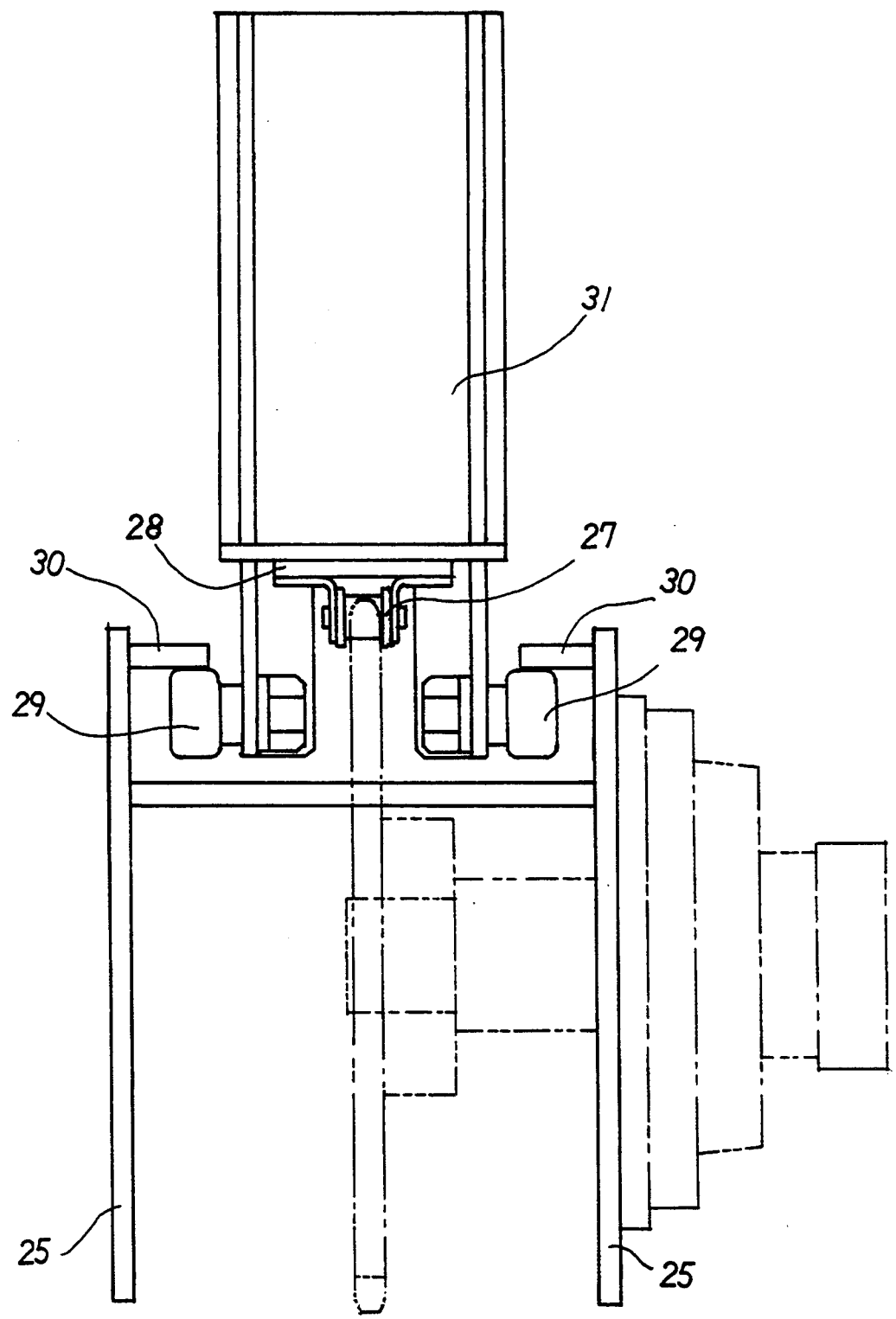
FIG. 9 is an enlarged partial side view of the main part of FIG. 8.

Close to the end positions of delivery conveyors 13, as shown in 8, a pair of frames 25, whose upper portions are curved, are mounted with an upward gradient, and chains 27 are mounted between sprockets 26 which are attached at the front end and at the terminal end of each frame 25, following the shape of each frame. That is to say, as shown in FIG. 9, guide rollers 29 are connected with respective guide rails 30 laid along the outline of the frame 25. Said guide rollers 29 are mounted extending from the portion of arbitrary links 28 of the chain 27, and the chain 27 circulates along them. A plurality of hooks 31 (FIG. 8) are mounted on the chain 27 at an arbitrary distance comprising a hook conveyor 32 therewith. The slope of the hook conveyor 32 becomes gradual at its upper portion, and as shown in FIG. 3, the end portion thereof is located over the center of the spindle 68 of the veneer lathe while being located at the front end of a machine frame of a designated length.

Figure 2:
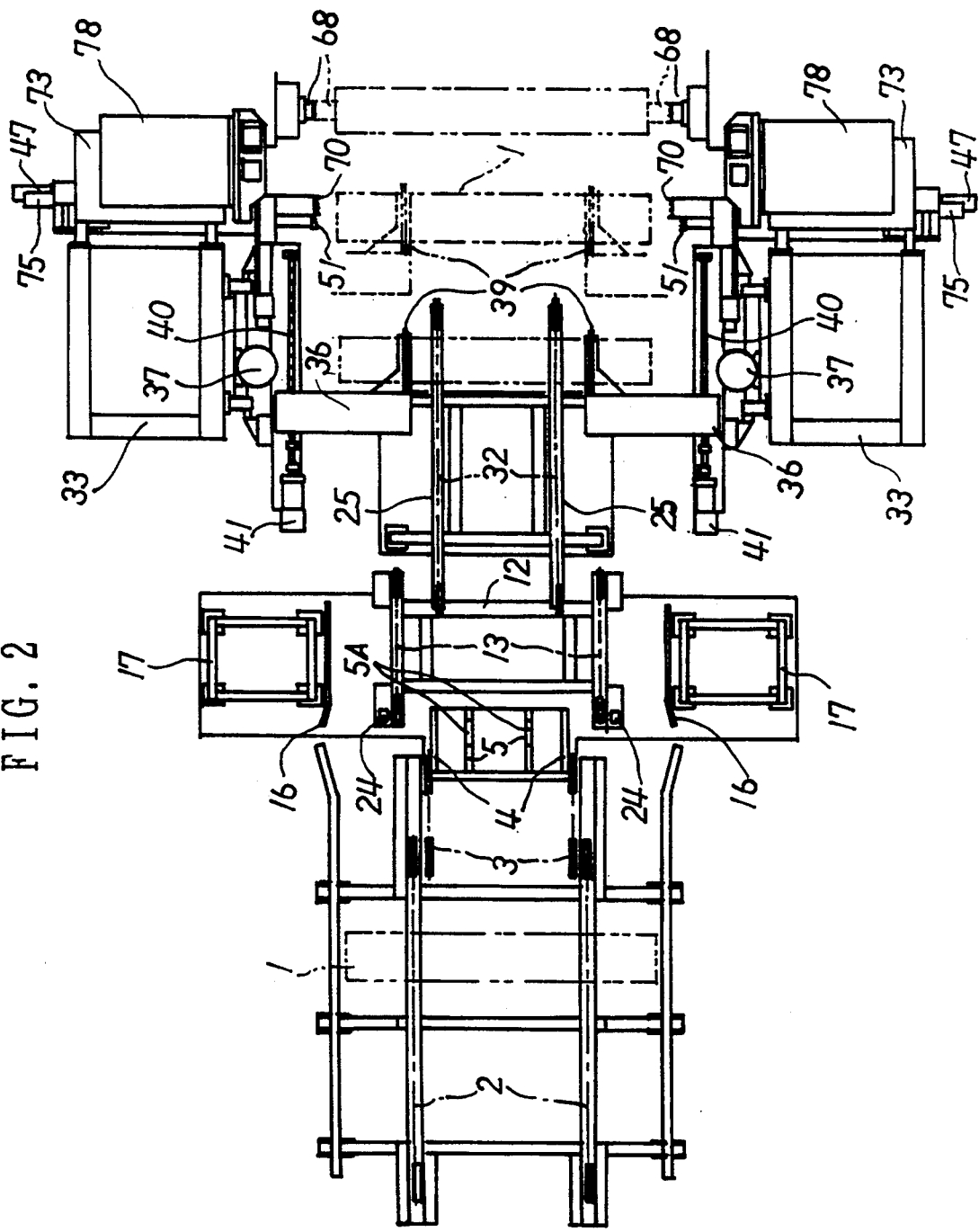
FIG. 2 is an elevation of an embodiment of this invention.

A pair of vertical feeding shafts 34 (FIG. 10), which are threaded, are supported at an arbitrary distance on the front end of said machine frame 33, and a supporting member 36 is mounted on each vertical guide 35, while each said vertical feeding shaft 34 is screwed to 36. Thus the supporting member 36 is traversed up and down by a vertical feeding motor 37 connected to the basal end portion thereof. A pair of V-shaped transporters 39 are mounted movably from the position D 1 for virtually centering the log to the real centering position D2 by using horizontal guides 38, as shown in FIG. 2. The log supplied from the hook conveyor 32 is supported by this pair of transporters 39. The transporters 39 are screwed on respective threaded horizontal shafts 40, which are mounted on the supporting members 36, and said transporters 39 are moved in the horizontal direction by a horizontal feeding motor 41 connected to one end of said horizontal feeding shafts 40.

Figure 11:
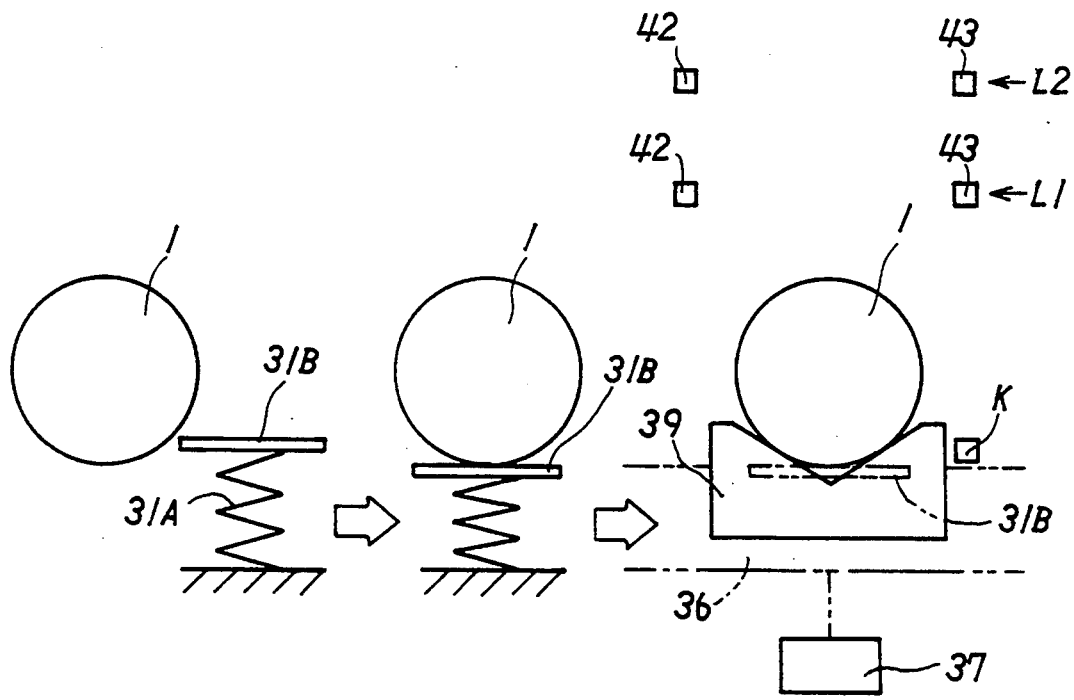
FIG. 11 is a figure explaining the action in the neighborhood of the part D in FIG. 1.
Figure 12:
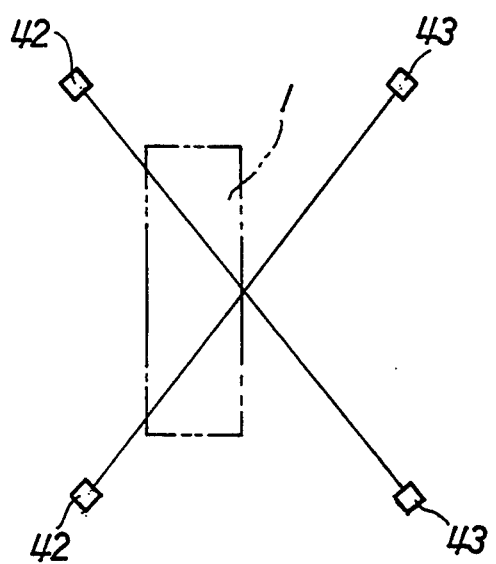
FIG. 12 is an elevation of the upper part of D in FIG. 1.

As is schematically shown in FIG. 11, a spring 31A and indicator 31B, for indicating the lower surface of the log are mounted adjacent to the end portion of said hook conveyor 32, and the indicator 31B is movable up and down by means of a fluid pressure, and so on, within a designated distance, contacting with the lower surface of the log 1. The position for starting the elevation of the log 1 is determined by a lower detector K which detects the indicator 31B (for indicating the lower surface of the log). Furthermore, plural pairs of upper detectors L1, L2 . . . , each of which is located at a different height, are mounted over them for providing measuring positions in different levels in accordance with the diameter of the log 1. These upper detectors L1, L2 . . . are, for example, photoelectric type ones comprising light emitters 42 and light receivers 43 facing each other, wherein the light emitted from the light emitter 42 is shielded by the upper surface of the log 1 sending a signal of upper surface detection. Each pair of light emitter 42 and light receiver 43 are mounted without disturbing the log transportation as shown in FIG. 12.

Figure 13:
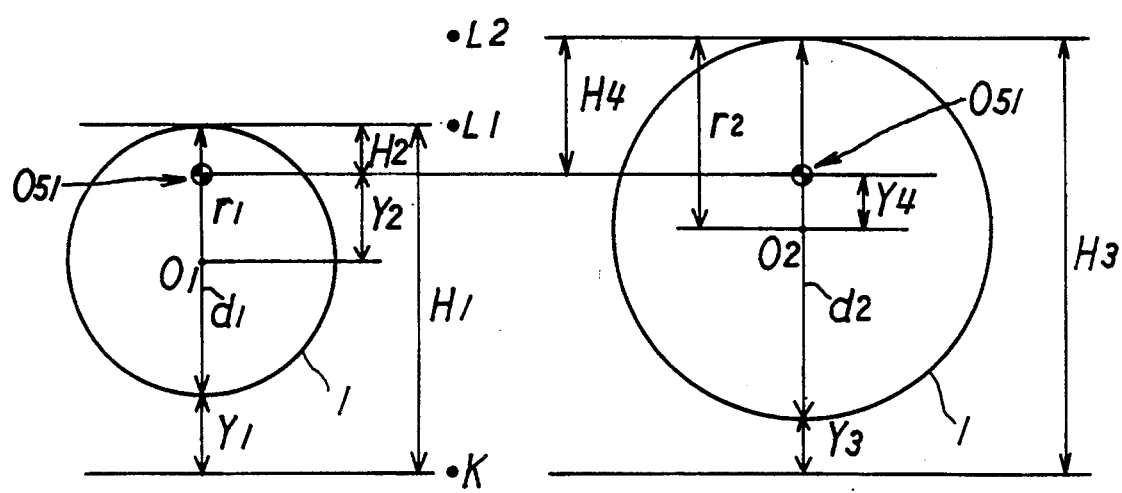
FIG. 13 is a figure explaining the method for calculating a virtual center.

As is shown in FIG. 13, after the detection of the lower surface of the log 1 (indicator 31B) by the lower detector K, the diameter of the log 1, $d_1$ or $d_2$, is calculated according to the height $Y_1$ or $Y_2$. The log 1 is elevated until the upper detectors $L_1$ or $L_2$ detect the upper surface of the log. The height $H_1$ and $H_3$ are fixed so that $d_1$ or $d_2$ can be determined by a subtraction of $Y_1$ or $Y_2$ therefrom, and the virtual center $O_1$ or $O_2$ is determined. After that, the log 1 is elevated by the transporters 39 until said virtual center agrees with the center ($O_{51}$) of holding claws 51, which will be mentioned later.

In the embodiment mentioned above, the upper surface of the log 1 is detected by photoelectric type detectors with no contact. The detector, however, can be replaced with mechanical-contact type ones which are moved down and synchronized with the elevation of the log 1. In this case, the virtual center is determined according to the distance which the log 1 is elevated until the detector contacts with the upper surface of the log.

Figure 14:
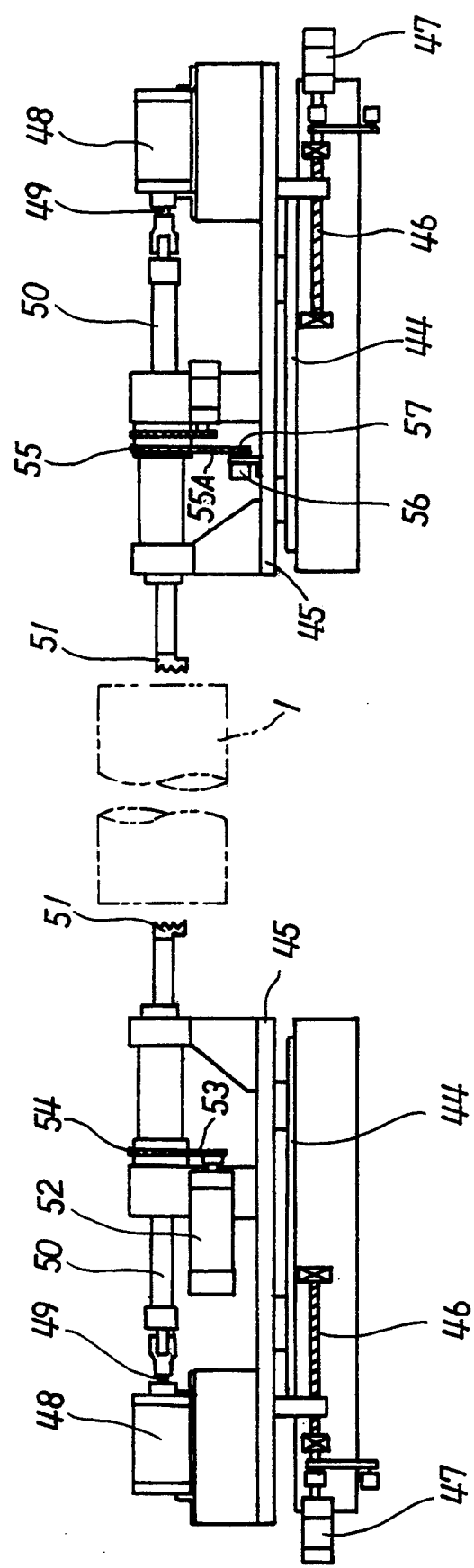
FIG. 14 is a partial front view of FIG. 1 enlarging the part E.

On the tip of said horizontal feeding shaft 40 in FIG. 2, a log centering apparatus is mounted. The turning center of the log 1 is determined according to the peripheries of cross sections, which are detected at plural positions along the longitudinal direction of the log by rotating the log 1 around the virtual center with one revolution. That is to say, as shown in FIG. 14, bases 45 are loaded on a pair of guides 44 arranged on the right and the left sides of the log 1, respectively, along the longitudinal direction thereof, while each said base 45 is screwed on a threaded horizontal feeding shaft 46. The base 45 is moved along the longitudinal direction of the log 1 by a motor 47 which is connected with the one end of said threaded horizontal feeding shaft 46.

On said pair of bases on the left and the right, a pair of cylinders 48 for holding the log 1 are mounted facing each other. The tips of the piston rods thereof are connected with the respective rear ends of spindles 50, which are supported around the middle of respective bases 45. On each tip of said spindle 50, a holding claw 51, which is to be inserted into the end surface of the log 1, is mounted. A chain wheel 54, which is driven by a motor 52 mounted on each base 45 through a chain 53, is inserted movably in the axial direction being integrated with respect to the rotation direction. On the other side, on the spindle 50 on the subordinate side facing thereto, a gear 55 is mounted movably in the axial direction being integrated with respect to the rotation direction. This gear 55 is engaged indirectly with the pinion gear 57 of a rotary encoder 56 mounted on the base 45 through a cooperating gear 55A, thereby consisting a rotation angle detector for measuring the rotation angle of the log 1. This rotation angle detector consists of a periphery detector for the log 1 cooperating with the displacement detector, which will be mentioned later.

Figure 15:
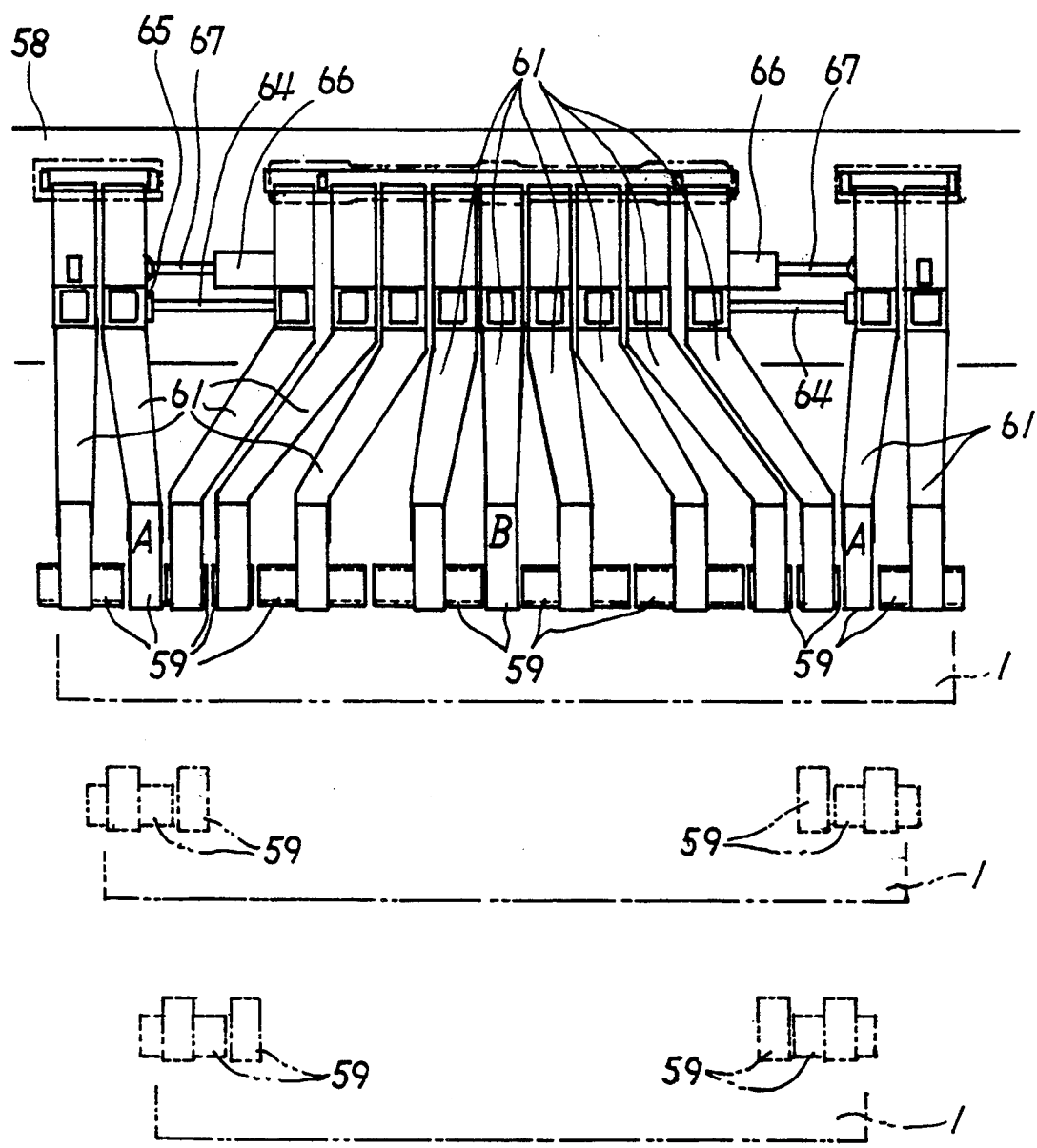
FIG. 15 is a partial elevation of FIG. 1 enlarging the part F.
Figure 16:
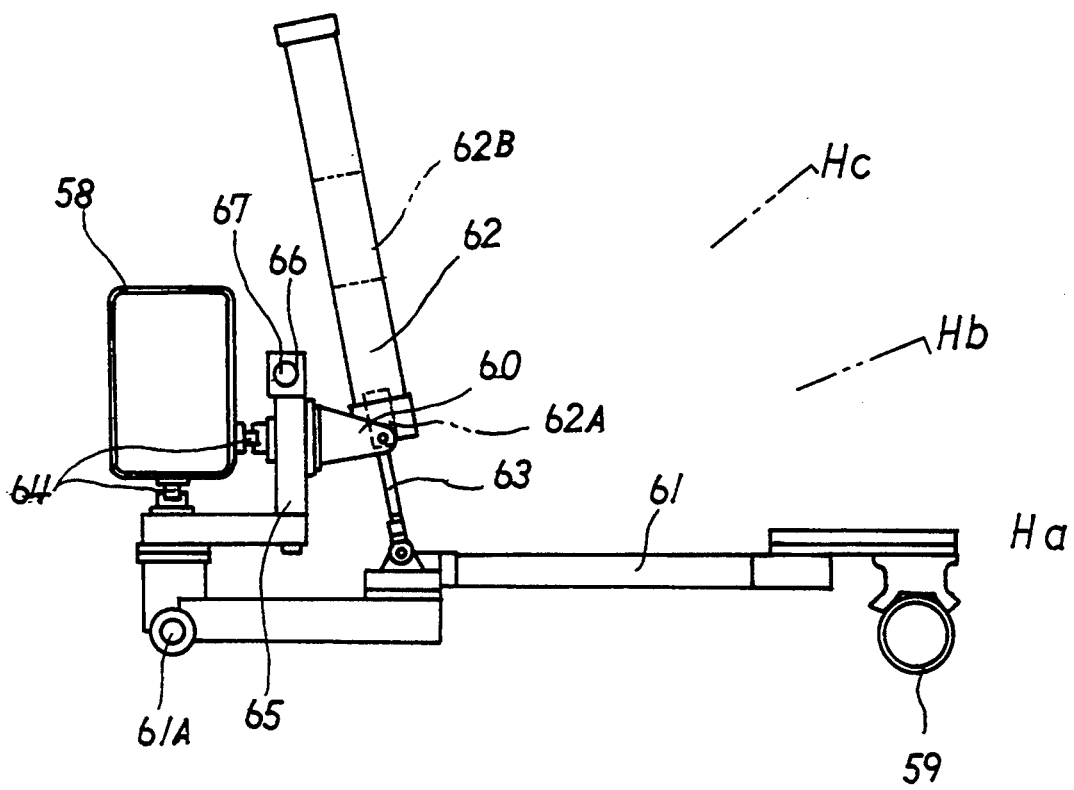
FIG. 16 is an enlarged side view of FIG. 15.

As is shown in FIG. 15, multiple contact type detecting elements 59 are mounted on a horizontal beam 58, wherein respective detectors 59 have arbitrary lengths and are arranged so as to cover detecting regions juxtaposed almost closely over the length of the log 1 (the number of detectors is 13 in the embodiment presented in the figure). Furthermore, the same number of displacement detectors as that of said detecting elements 59 are mounted for measuring the displacements of said detecting elements 59. That is to say, a plurality (thirteen in this embodiment) of rocking arms 61 are mounted to be able to rock around the pivots on the basal portions thereof with pins 61A (FIG. 16) on the horizontal beam 58, and said detectors are mounted on respective tips thereof. Cylinders 62 for lifting each rocking arm are mounted by pins between a pair of brackets 60 in front of the horizontal beam 58 while the tips of piston rods 63 thereof are connected to respective said rocking arms 61 by pins.

The cylinders 62 support a part of the weight of the rocking arms, thereby the detecting elements 59 of respective rocking arms contact with the outer surface of the log 1 due to the rest of the weight of the rocking arms, while detecting the displacements of said detecting elements 59 through the rocking arms 61 by means of a linear encoders 62A built therein. Each cylinder 62 functions as a lifter for lifting each rocking arm from the position $H_a$, for detecting the periphery of the log 1, to the upper limit position $H_c$, while comprising a break portion 62B which holds said each rocking arm 61 at an arbitrary position $H_b$ for making said rocking arm 61 stand by at the optimum position in accordance with the diameter of the log 1.

In the embodiment disclosed in FIG. 15, peripheries of 13 cross sections in the longitudinal direction are obtained. The direction of the largest right circular cylinder possible along the longitudinal direction of the log 1 is found according to the data of the three cross sections, i.e., the ones adjacent to both the end A, A of the log 1 and the one in the middle of the log 1, obtained by the detecting elements 59. The turning center is to be obtained as the center line of the largest right circular cylinder with respect to said direction, according to the data from all 13 cross sections. The details will be described later.

Although the number of the detecting elements 59 for detecting the peripheries of cross sections of the log 1 is, for example, 13, the number of the detecting elements 59 can be reduced when the length of the log 1 is short so that the total width of the detecting elements 59 is adjusted to be approximately the same length as that of the log 1. For example, in a case of classifying the lengths of logs in three levels, the number of the detector can be selected from 13, 11 and 9 according to respective length of the log 1. Since the end portions of the log 1 are used as the portions for determining the turning center, two rocking arms 61 and corresponding cylinders 62 (FIG. 16) for each end portion, i.e., four in total, respectively, are not mounted stationary but movably in the longitudinal direction of the log 1. That is to say, arm guides 64 are mounted on the horizontal beam 58, and slide brackets 65 are mounted on said arm guides 64. Furthermore, the piston rods of cylinders 66, mounted on the horizontal beam 58 for sliding the arms 61, are connected with the slide brackets 65.

The rocking arms 61 except for the ones located near the ends of the log 1 are inclined outward, like a fork, and extending toward the outer surface of the log 1. All the 13 rocking arms 61 and detecting elements 59 are used for a long log. On the other hand, for a short log, the rocking arms 61 with the detecting elements 59 except for one or more located near the middle are withdrawn from the outer surface of the log 1, and then rocking arms 61 near the end of the log 1 are shifted to the position close to the middle. The amount of the shifting can be incrementally adjusted, for example, by increasing the number of rocking arms 61 to be withdrawn.

For transporting the log 1 centered from the centering position to the spindle 68 of the veneer lathe in FIG. 1, a pair of inclined beams 69 are mounted facing each other with respect to the passage of the transportation for the log 1, and movably in the facing direction by means of a moving mechanism, which will be mentioned later. Furthermore, transportation claws 70 are mounted on respective inclined beams 69 which are movable reciprocatingly in the inclined direction by a reciprocating mechanism, and the inclined beams 69 are moved up and down by an elevating mechanism.

Behind the spindle 68 of the veneer lathe, a backup roller device T is mounted for providing a force to cancel the force from the blade S of the planer table R due to the turning of the log 1. The inclined beams 69 provides a passage inclined downward for transporting the log 1 without interfering with said backup roller device T.

Figure 18:
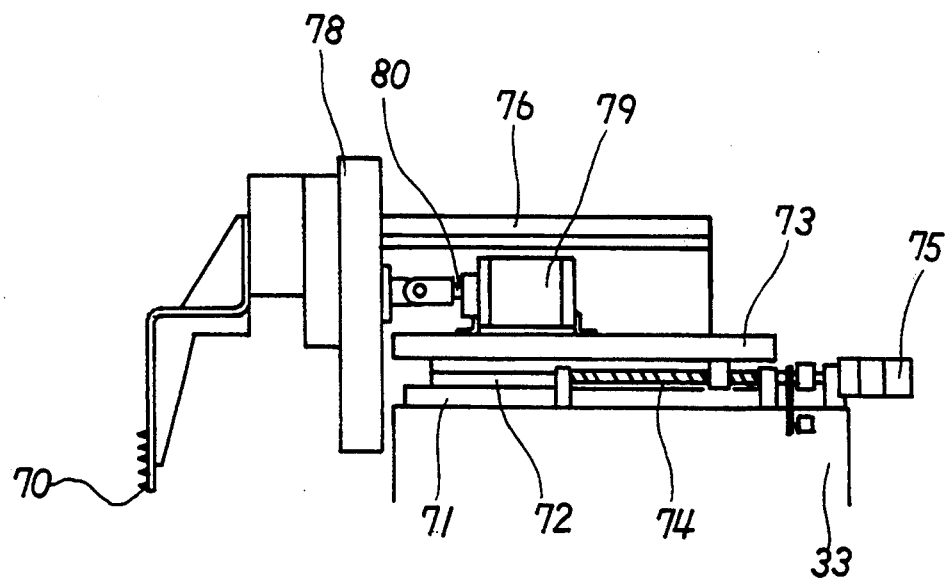
FIG. 18 is a side view of FIG. 17.

The moving mechanism previously mentioned comprises a linear guide 71, which is mounted on said machine frame 33 in the direction crossing over that of transportation of the log 1 as shown in FIG. 18, and a supporting frame 73, with a linear block 72, mounted on said linear guide 71. The supporting frame 73 is screwed on a threaded feeding shaft 74, which is mounted on the machine frame 33, and is movable with the aid of a motor 75 rotating the feeding shaft 74. Furthermore, a transporting member 78 is mounted on a horizontal guide 76 of the supporting frame 73 while the piston rod 80 of the cylinder 79 for the inclined beam 69, which is secured on the supporting frame 73, is connected with the transporting member 78, making the transporting member 78 movable with respect to the supporting frame 73.

A pair of guides 81 (FIG. 17) are formed perpendicularly on the front portion of the transporting member 78 at a designated distance along the direction of transportation of the log 1, and the respective said inclined beams 69, extending from the log centering position to the neighborhood of the spindle 68 of the veneer lathe, are mounted on these guides 81. The inclined beam 69 is screwed on a threaded vertical feeding shaft 82, which is supported by the transporting member 78, and moved up and down by the motor 83 connected to the one end of said shaft 82. Furthermore the piston rod 85 of the cylinder 84, which is secured on the transporting member 78, is connected with the inclined beam 69. Said cylinder 84 is always applying an upward force upon the inclined beam 69 and the log 1 in transportation by an incremental or non-incremental pressure. Thus the lifting mechanism comprising said vertical feeding shaft 82 and the motor 83 is operated by a small force without requiring the force equivalent to the weight of them.

With the vertical feeding shaft 82 of the lifting mechanism, a Y-distance measuring equipment 83A is connected, which comprises, for example, mainly a pulse generator for transforming the revolutions of the servo motor 83 for driving the vertical feeding shaft 82, to pulse signals. The Y-axial distance is measured from the number of the pulse signals. Other types of Y-distance measuring equipment are also available besides this. The candidates are, for example, a magnetic scale which determines the Y-axial distance directly. When a fluid cylinder mechanism is used as a power source instead of the motor 83, a rotary encoder, which measures the extension or retraction of the piston rod by transforming it into a rotation angle, can be used.

Said transportation claw 70 is mounted through a linear block 88 on an inclined guide 87 formed on the inclined beam 69 and screwed on an inclined threaded feeding shaft 86, which is mounted along the inclined direction. The claw 70 is moved reciprocatingly along the inclined direction by a motor 89 connected with one end of the inclined feeding shaft 86. The piston rod 91 of cylinder 90, which is secured on the inclined beam 69, is Connected with the transportation claw 70 through a chain 92. Said cylinder 90 is always applying an upward force upon the transportation claw 70 and the log 1 held by the claw 70 in incremented or non-incremented pressure. Thus a reciprocating mechanism can be operated by a small force without requiring the force equivalent to the weight of them.

With the inclined feeding shaft 86 of said reciprocating mechanism, a X-distance measuring equipment 70A comprising, for example, a rotary encoder, and so on, is connected for measuring the moving distance of the transportation claw 70. Although the data for adjusting the turning center obtained by using the log centering apparatus are presented as distances on the X and Y axes in a rectangular coordinates system, the resulting data for the adjustment against the transportation claw 70 are presented as distances on the vertical and inclined feeding shafts 82 and 86, and these data are not indicated in rectangular coordinates. Therefore, the data for adjusting the position of the transportation claw 70 should be transformed into those on the non-rectangular coordinates system, wherein the X' and Y' axes are set on the inclined and vertical feeding shafts 86 and 82, respectively. In this embodiment, for easy explanation, the inclined feeding shaft is to be regarded as an equivalent of the X axis.

Now, the operation of the embodiments mentioned above is going to be explained in the following.

In FIG. 1, a log 1 from which the bark has already been peeled off is transported on the log conveyor 2 and sent to the delivery conveyor 13 via the intermediary conveyor 3. Then, the pinion gear 7 is rotated in the normal direction being driven by a motor 8 in FIG. 5, and respective racks 6 are engaged thereto and controlled in up and down motions. That is to say, in FIG. 1, the first receiving frame 4 is sunk beneath the level of the transportation passage while the second receiving frame 5, having an upward slope along the transporting direction, is raised over the level of the transportation passage, and each of them stands by for receiving the log. When the log detector 5A (FIG. 4) confirms the arrival of the lower surface of the log 1 to the end of the intermediary conveyor 3, and the contact between the front surface thereof with the upward slope of the second receiving frame, the log 1 is received by the first receiving frame 4 at the position beneath the level of the transportation passage and the center of the gravity of the log 1 moves. The log 1 is halted at the lower portion thereof by the end of the intermediary conveyor 3, and at the front surface by the upward slope of the second receiving frame 5 (FIG. 3).

After that, the pinion gear 7 (FIG. 5) is rotated in the reverse direction for bringing the upper portions of the first and second receiving frames 4, 5 in the same level. In this state, the diameter of the log 1 is detected by the log diameter detector 9. If the diameter exceeds the upper permitted limit or is far short of the lower permitted limit, the log 1 is rejected from the supply for centering. When the log is within the limit, the position of the delivery conveyor 13 is adjusted along the longitudinal direction of the log 1 for receiving the log 1, which is halted in the pair of the first and the second receiving frames 4, 5.

That is to say, if each log end detector 24 mounted on both the ends of the shifting table 12 are detecting both end portions of the log 1 simultaneously, the log 1 is in the position wherein allowed to be delivered to the pair of delivery conveyor 13 located between the log end detectors 24. On the other hand, if either the log 1 or the shifting table 12 is shifted in the fight or in the left with respect to the transportation direction, one of the two log end detectors will not detect the log 1. In this case, motor 23 (FIG. 6) is driven for moving the shifting table 12 until both the log end detectors 24 detect two end portions of the log 1 simultaneously, and the log 1 is just in front of the shifting table 12.

By the further subsequent rotation of the pinion gear 7 (FIG. 5) in the reverse direction, the first receiving frame 4 is raised over the level of the transportation passage, and the second receiving frame is descended beneath the level of the transportation passage, thereby the log 1 is delivered to the delivery conveyor 13. When a plurality of logs 1 are remaining on the log conveyor 2 because the supply of logs 1 exceeds the capability of the next turning step, the first receiving frame 4 stops the supply of the log 1 with its vertical back end.

The log 1 delivered to the delivery conveyor is transported forward in accordance with the circulation of the delivery conveyor 13. During the transportation, the operation for centering the log 1 in the middle of the transportation passage is performed. That is to say, when the cylinder 18 is operated (FIG. 6, 7) and one support frame 14 is advanced in the longitudinal direction of the log 1 in transportation, the other support frame 14 also advances with the same distance through a connecting bar 21. When the log 1 is transported shifted to the fight side with respect to the center line of the delivery conveyor 13, the contactor 16 on the right side contacts with the fight end portion of the log 1 prior to that on the left side when the pair of contactor advance from their stand by position with the same distance. When the cylinder 22 detects the contact and output a signal for starting the motor 23, the shifting table 12 is shifted to the left side along with the log 1. At this time, while the contactor 16 on the right side is contacting with the fight end of the log 1, each slider 17 is further approached by the cylinder 18 following thereto. When the contactor 16 in the opposite side contacts with the left end of the log 1, and the cylinder 22 detects the contactor 16, a stopping signal is sent to the motor 23, and the motion of the shifting table 12 is stopped. Thus, the log 1 is positioned in the middle of the passage of the log transportation, and the length of the log 1 is measured simultaneously according to the extending amount of the cylinders 18 (the advancing distance for each slider 17).

In such way, the log 1 has its position adjusted along the longitudinal direction during the transportation by the delivery conveyor 13 in FIG. 1, and reaches to the starting end of the hook conveyor 32. The log 1 is transported by a pair of hooks 31 on the fight and the left along the upward slope and sent to the position for determining the virtual center. At the position for determining the virtual center, the indicator 31B (for indicating the lower surface of the log) is pushed down to the level of the transportation passage due to the contact with the lower surface of the log 1, and the hook conveyor 32 stops there.

Next, when the supporting members 36, which are holding a pair of transporters 39 at the front end, are lifted, the log 1 located on the terminal end of the hook conveyor 32 is transferred onto the pair of transporters 39. At this time, the indicator 31B rises in some distance and is detected by the lower detector K. The number of the pulses corresponding to the lifting distance for the transporters 39 has begun to be counted from the moment thereof. After that, while the lower surface of the log 1 is departing from the indicator 31B, the lifting distance of the log 1 is integrated until the upper surface of the log 1 is detected by the light emitter 42 and the light receiver 43 of any of the upper detectors L1, L2 . . . , each of which is located at a different height.

At this time, the class to which the diameter of the log 1 belongs is judged. The diameter is classified in, for example, two or three classes, i.e., large, medium or small, and so on, depending upon the number of the upper detectors $L_1$, $L_2$ . . . . As is shown in the left part of FIG. 13, for example, the diameter of the log 1 is obtained by subtracting the integrated lifting distance $Y_1$ from the distance $H_1$ between the upper detector $L_1$ and lower detector K, i.e., $H_1-Y_1$. The transporter is lifted with the distance $Y_2$, the difference between the radius $r_1$ of the log 1 and the distance $H_2$ from the position of the upper detector $L_1$ to the center $O_{S1}$ of the holding claw 51, i.e., $r_1-H_2$. For the right part of FIG. 13, the upper detector $L_2$ detects the upper surface of the log 1. The radius of the log 1 is obtained as $r_2=(H_3-Y_3)/2$ as well, and the further lifting distance for the transporter 39 is determined from the equation of $r_2-H_4=Y_4$.

Figure 10:
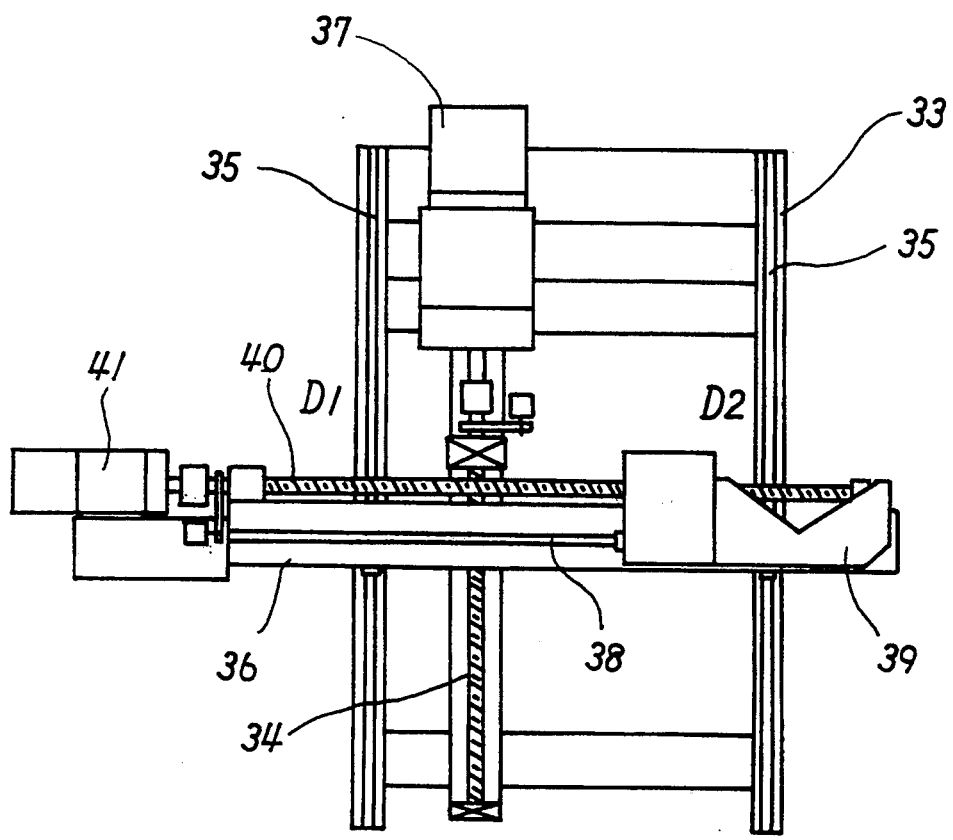
FIG. 10 is a partial side view of FIG. 1 enlarging the part D.

Anyway, when the virtual center $O_1$ or $O_2$ of the log 1 is raised, the pair of transporters 39 is moved a designated distance along the horizontal guide 38 by the horizontal feeding shaft 40 as shown in FIG. 10, and brings the virtual center portion of the log 1 onto the straight line connecting the two centers of the pair of holding claws 51 in the fight and left in FIG. 14. At this time, the detecting elements 59, having detected regions juxtaposed closely over the length of the log 1, and the rocking arms 61 stand by at the position in accordance with the diameter of the log 1 detected by the upper detectors $L_1$, $L_2$, and so on.

On the other side, the bases 45 support the holding claws 51 which stand by to have their positions adjusted by the threaded horizontal feeding shaft 46 and the motor 47 in accordance with the lengths of logs 1 transferred. The log 1 is then held by a pair of holding claws 51 operated by a pair of cylinders 48. After the holding, the transporters 39 of FIG. 10 are lowered by the operation of the motor 37, and further retracted to the stand by position, located on the left bottom of the figure, by the operation of the motor 41 thereby awaiting the next log.

During this period, respective detecting elements 59 (FIG. 15) of the rocking arms 61 contact the outer surface of the log 1, and the holding claws 51 rotate the log 1 one revolution by the operation of the motor 52 (FIG. 14). The rotation angle thereof and the absolute displacement of the detecting elements 59 with respect to the line connecting the virtual centers on both end surfaces of the log 1 are detected synchronously by a rotary encoder 56, rotation angle detector, and a linear encoder 62A (FIG. 16), displacement detector, respectively.

Therefore, the electric signal corresponding to an arbitrary angle detected by a rotation angle detector and that corresponding to the displacement detected by a displacement detector are synchronously taken out. For example, the peripheries of 13 cross sections are detected as a set of points corresponding to each small increment of the rotation angle.

Figure 19:
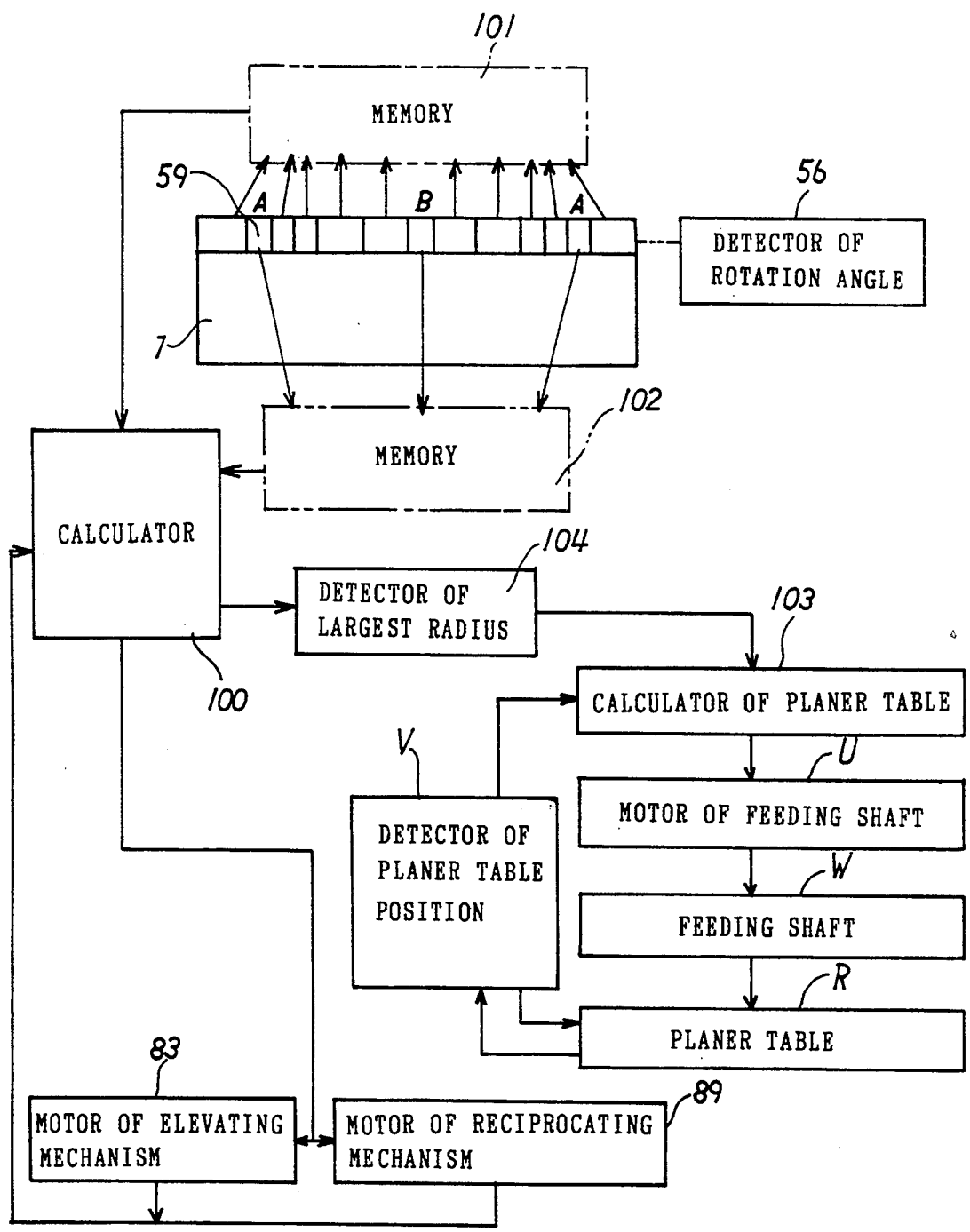
FIG. 19 is a block diagram presenting the control system in an embodiment of this invention.
Figure 20:
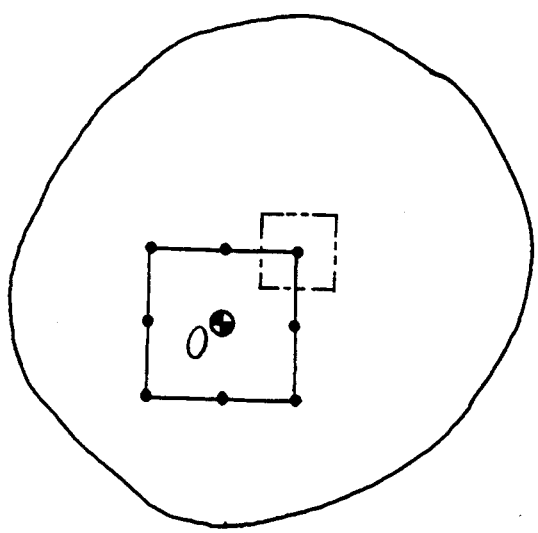
FIG. 20 is a figure conceptually explaining an example of calculation of the largest inscribed circle.

Next the operation system thereof is explained by using a block diagram of FIG. 19. The data for the peripheries of 13 cross sections obtained in such way as mentioned above are stored in the memories 101 or 102. First of all, the respective largest inscribed circles for three cross sections (i.e., the ones adjacent to the both the end A and A of the log 1 and the one in the middle of the log 1) are obtained from the data thereof by using a calculator 100. In the embodiment of the figure, the detector 59 is adjacent inside to the outermost one. In a conceptional representation in accordance with, for example, a finite element method, first a square matrix comprising the virtual center O inside is set, next respective shortest distances for plural points on the matrix, and finally the optimum point on the matrix is determined according to said shortest distances. In the next step, another square matrix, centered on said optimum point obtained from the former matrix, is newly set and the optimum point is determined in the same way. Thus, the size of the matrix is decreased in the repetition of such procedure, and the final point remaining in the predetermined smallest matrix is adopted as the center of the largest inscribed circle.

Figure 21:
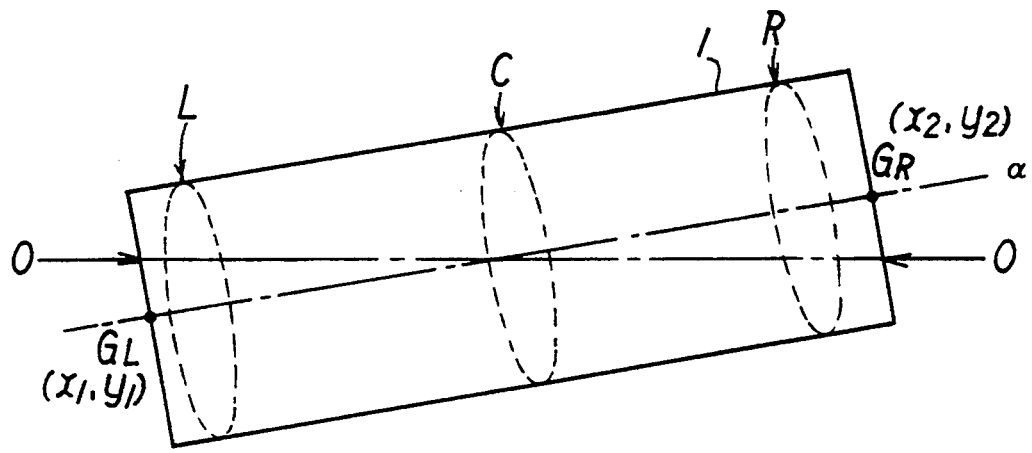
FIG. 21 is a figure conceptually explaining the geometrical relationship between the virtual center and the turning center of the log.
Figure 22:
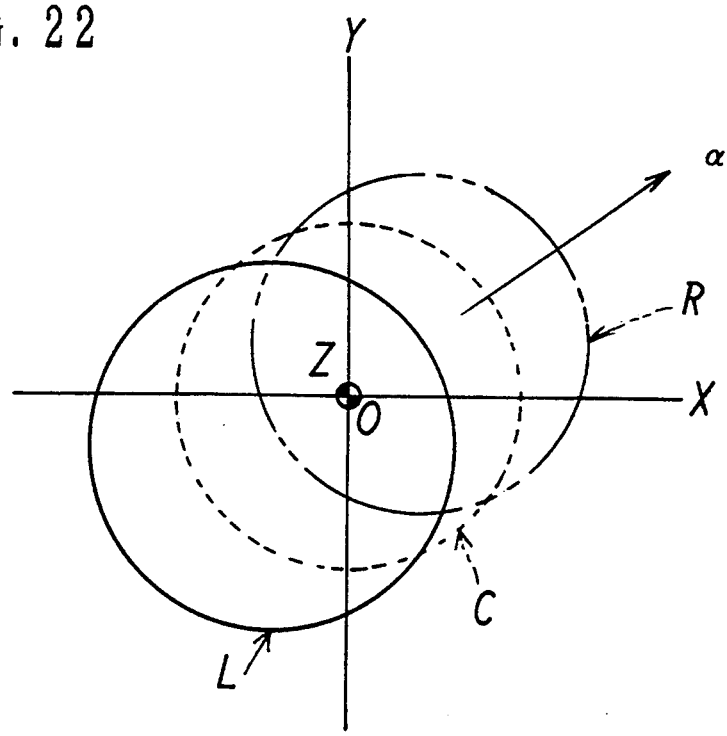
FIG. 22 is a view of FIG. 21 from a different angle.

After the determination of respective largest inscribed circles for three cross sections, i.e., the ones adjacent to the both the ends and the one in the middle of the log 1, the direction of the largest right circular cylinder possible along the longitudinal direction is forecasted according to the geometrical arrangement of these three largest inscribed circles. As is shown conceptually and exaggeratedly in FIG. 21, the virtual center O is set roughly in some degree so that it generally has an arbitrary twist angle with respect to the real turning center. Although the largest right circular cylinder has a relatively small size along the direction parallel to the twisted virtual center, that having a considerable size can be found in the direction $\alpha$ of FIG. 21. Therefore, the problem is to find the optimum direction in the X-Y-Z space presented in FIG. 22, wherein the Z axis is set on the virtual center axis O, according to the arrangement of the center of these circles, so that the three cross sections, i.e., R in the right, C in the center, L in the left, have the largest common area (overlapping area) on the X-Y projection. Conceptually, it is equivalent to making a new $X'$-$Y'$-$Z'$ space presented in FIG. 23, wherein the direction ct agrees with the $Z'$ axis, by a transformation of the coordinate system, such as a rotation or a translation. The candidate of such a direction $\alpha$ is, for example, a straight line having the least sum of respective distances from the centers of said largest inscribed circles L, C and R. Such line can be determined by a method of least squares.

Figure 23:
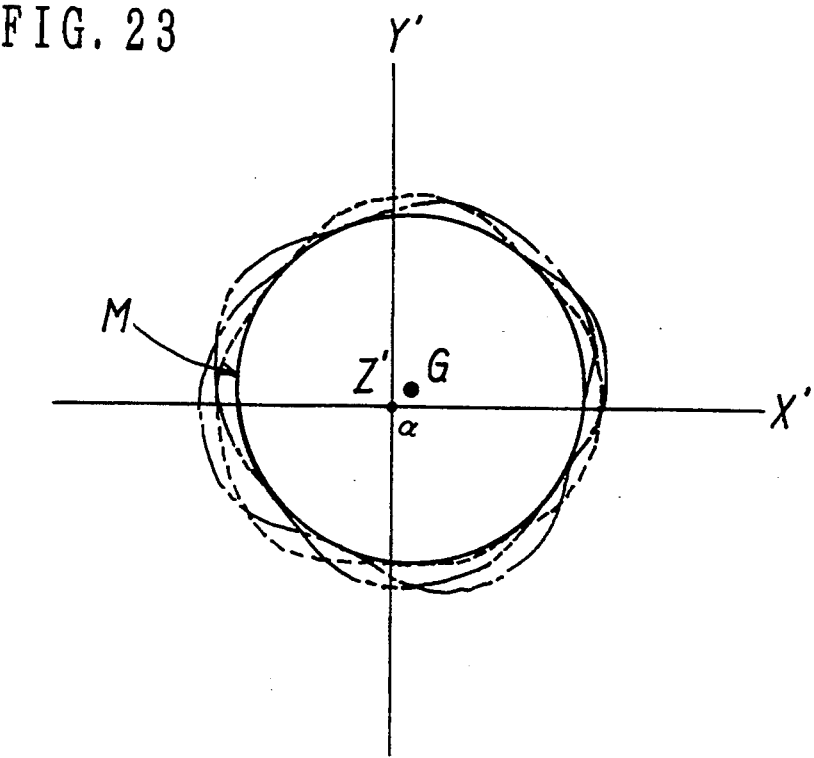
FIG. 23 is a figure conceptually explaining the coordinates corresponding to FIG. 21.

As is conceptually presented in the FIG. 23, all peripheries of 13 cross section are overlapped on the $X'$-$Y'$ projection in the new $X'$-$Y'$-$Z'$ space. The largest right circular cylinder M settled inside them is obtained, and the center line thereof is adopted as the anticipated turning center. In the end, the intersections of the center line with both the end surfaces of the log are the left turning center $G_L$ and the right turning center $G_R$ shown in FIG. 21. Although these points are the ones on the X-Y projection in the X-Y-Z space before the transformation, these points are to be presented as two-dimensional points $G_L$ (x1, y1), $G_R$ (x2, y2) on the X-Y two-dimensional plane with the origin on the virtual center O for easy explanation.

The calculation of such largest inscribed circles, the determination of the direction of the largest right circular cylinder and the calculation of the largest right circular cylinder are performed by the calculator 100 in FIG. 19. The calculator 100 can consist of a central processing unit (CPU) of a computer, and so on. Said memories 101, 102 can also consist of computer memory devices. Then, the resulting coordinates of the turning center are output to the motor 83 of the elevating mechanism for the inclined members 69 and the transportation claws 70, and also output to the motor 89 of the reciprocating mechanism.

The stand by position of the transportation claws 70 in FIG. 18 is predetermined in accordance with the length of the log 1. The claws 70 are inserted into the upper portions of both end surfaces of the log 1 by the operation of the cylinders 79 for the inclined beams 69. Then the holding claws 51 leave the center portion of both the end surfaces. The adjustments of each transportation claw 70 on X- and Y-axes for the turning center of the relating log 1 can be completed through the process mentioned below either before or after the delivery of the log between the holding claws and the transporting claws.

That is to say, the deviation of coordinates on the X- and Y-axes between the turning center and the virtual center is determined for each end surface of the log 1. The X-axial deviation is output to both the motors 89 of reciprocating mechanisms on the right and the left while the transportation claws 70 are advanced along the guide 87 by the inclined feeding shafts 86. The advancing amounts sequentially detected by the encoder 70A are fed back to the calculator 100, and the adjusting amount is precisely controlled.

Figure 17:
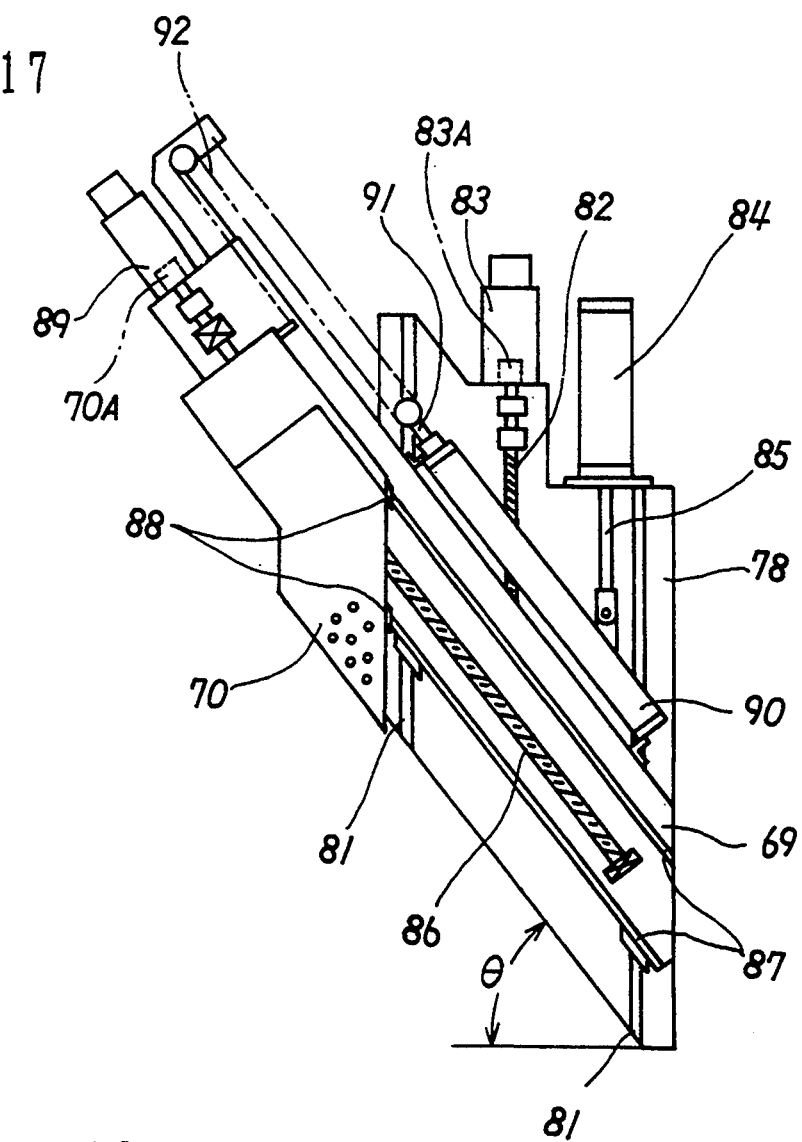
FIG. 17 a partial side view of FIG. 1 enlarging the part G.

In FIG. 17, the right bottom direction of the inclined feeding shaft 86 and the bottom direction of the vertical feeding shaft 82 are set forth as the positive direction. When the stand by position, i.e., the origin, of the transportation claw 70 of each inclined beam 69 is set at the position a little before the front end (upper end) of the inclined feeding shaft 86 (in other words, when each inclined beam 69 is standing by at the position, whereat a negative deviation on the X-axis between the turning center and the virtual center is taken into account), it is preferable that each transportation claw 70 be advanced a designated distance along the feeding shaft 86. This happens after the position of each transportation claw 70 is individually adjusted by the motor 89 from the origin in the positive or the negative direction with a distance equivalent to the deviation along the X-axis on the end surface of the centered log. On the other hand, when the stand by position of the claw 70 of each inclined beam 69 is set at the front end (upper end) of the inclined feeding shaft 86, each claw 70 is advanced a distance which is subtracted or added and is equivalent to the deviation.

When the stand by position, i.e., the origin, of the transportation claw 70 of each inclined beam 69 is set at the position a little lower than the front end (upper end) of the vertical feeding shaft 82 (in other words, when each inclined beam 69 is standing by at the position, whereat a negative deviation on the Y-axis between the turning center and the virtual center is taken into account), it is preferable that each transportation claw 70 be advanced a designated distance along the feeding shaft 86. This happens after the position of each transportation claw 70 is individually adjusted by the motor 83 from the origin in the positive or the negative direction with a distance equivalent to the deviation along the Y-axis on the end surface of the centered log. On the other hand, when the stand by position of the claw 70 of each inclined beam 69 is set at the upper end of the vertical feeding shaft 82, each claw 70 is advanced a distance which is subtracted or added and is equivalent to the deviation.

Next, the adjustment on each deviation will be described in detail according to the former method. The origin of the coordinates system is set on the virtual center O, and the coordinates of the turning center on the right and left end surfaces of the log are set as (GRX, −GRY) and (−GLX, GLY), respectively. In this case, the transportation claw 70 on the right is withdrawn from the origin with a distance of (GRX) on the inclined feeding shaft 86 while the transportation claw 70 on the left is advanced from the origin with a distance of (GLX) on the inclined feeding shaft 86. After that, both the claws 70 are advanced a designated distance. On the other axis, the inclined beam 69 on the right is withdrawn from the origin with a distance of (GRY) on the vertical feeding shaft 82 while the inclined beam 69 on the left is advanced from the origin a distance of (GLY) on the vertical feeding shaft 82. After that, both the inclined beams 69 are advanced a designated distance. Thus the turning center determined for the log 1 agrees with the center of the spindle 68 of the veneer lathe.

In the latter method, under the same setting of the coordinates, a distance equivalent to (GRX) is subtracted from the designated advancing distance for the claw 70 on the right while a distance equivalent to (GLX) is subtracted from the designated advancing distance for the claw 70 on the left. After the calculation, each claw 70 is advanced the respective distance calculated. On the other axis, a distance equivalent to (GRY) is subtracted from the designated advancing distance for the inclined beam 69 on the right while a distance equivalent to (GLY) is subtracted from the designated advancing distance for the inclined beam 69 on the left. After the calculation, each inclined beam is advanced the respective distance calculated. Thus the turning center determined for the log 1 agrees with the center of the spindle 68 of the veneer lathe.

Therefore, when the coordinates of the turning center are (0,0) (i.e., agree with the virtual center O), the deviations from respective origins for the claws 70 on the right and the left are zero, and the advancing amount on each inclined feeding shaft 86 becomes the designated one. Furthermore, the deviations from respective origins for the inclined beams 69 on the right and the left are zero, and the advancing amount on each vertical feeding shaft 82 becomes the designated one.

On the other hand, the planer table R of the veneer lathe is moved to the optimum position being controlled according to the data obtained during the centering. The controlling system thereof is explained by using said block diagram of FIG. 19. A detector 104 for detecting the largest radius detects the largest rotation radius (i.e., the distance between the turning center obtained and the farthest point on the periphery of the cross section) according to the data from the 13 cross sections. The result of the calculation is output to the calculator 103 of the planer table R and transmitted to the motor U for moving the planer table R on the feeding shaft W, and the position of the planer table R is fed back to said calculator 103 of the planer table R according to detector V which detects the position of the planer table.

Therefore, while the log 1 is transported by the transportation claws 70 on the inclined beams 69 from the turning center to the spindle 68 of the veneer lathe, the planer table R of the veneer lathe moves on the feeding shaft W according to the result of the calculation after the centering, thereby coming to a stand by at a position whereat a little spare gap is taken into account upon the largest radius of rotation for the log 1 so that the relating log 1 can be turned immediately.

In this embodiment, the direction of the largest right circular cylinder for the log 1 is obtained according to the data of the 3 cross sections corresponding to the detecting elements 59 on two end portions and a middle portion. These are chosen from a plurality of the detecting elements 59 juxtaposed closely along the longitudinal direction of the log 1. When the log has a relatively short length, or the log does not have significant twisting, or vending does not exists, use of only two cross sections instead of three cross sections is allowed.

Figure 24:
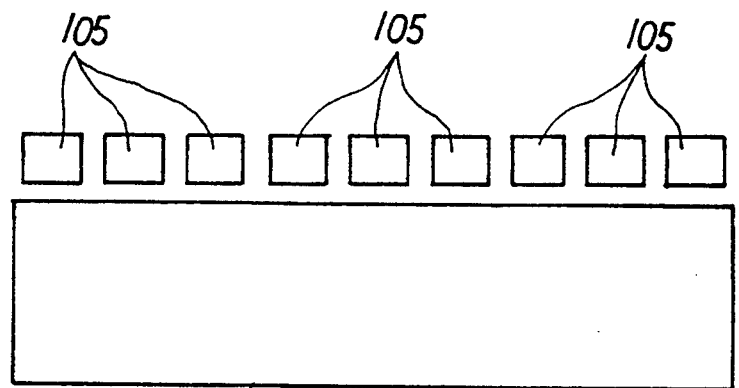
FIG. 24 is a figure explaining an example of arrangement for non-contact type periphery-detecting elements.
Figure 25:
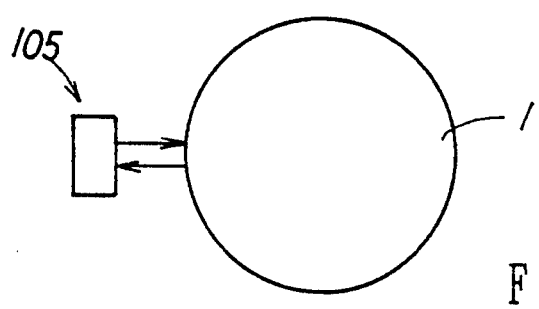
FIG. 25 is a figure explaining an example of periphery detection using a reflection system.
Figure 26:
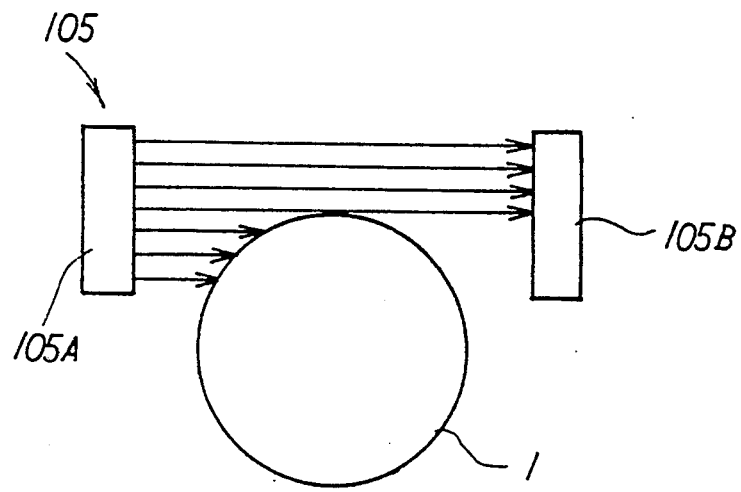
FIG. 26 is a figure explaining an example of periphery detection using a transmitting system.

In this embodiment, a plurality of contact type detecting elements using rocking arms are used as periphery detectors. Instead of them, non-contact type periphery detectors 105 juxtaposed closely along the longitudinal direction of the log 1 can also be used as shown in FIG. 24. Such non-contact type detectors are, for example, those using the reflection by the outer surface of the log of propagating medium, such as laser beam, electromagnetic wave (such as far infrared radiation or light from photoelectric cells), or ultra sonic wave, and so on (FIG. 25). On the other hand, an embodiment can be also constructed using the type wherein a plurality of light beams aligned in the direction of the height or a light band with a certain width spread along the direction of the height is projected toward the outer surface of the log, and the amount of light reaching to the light receiver 105B on the opposite side without being shielded by the outer surface of the log 1 is measured for determining the peripheries of the cross sections of the log 1.

Figure 27:
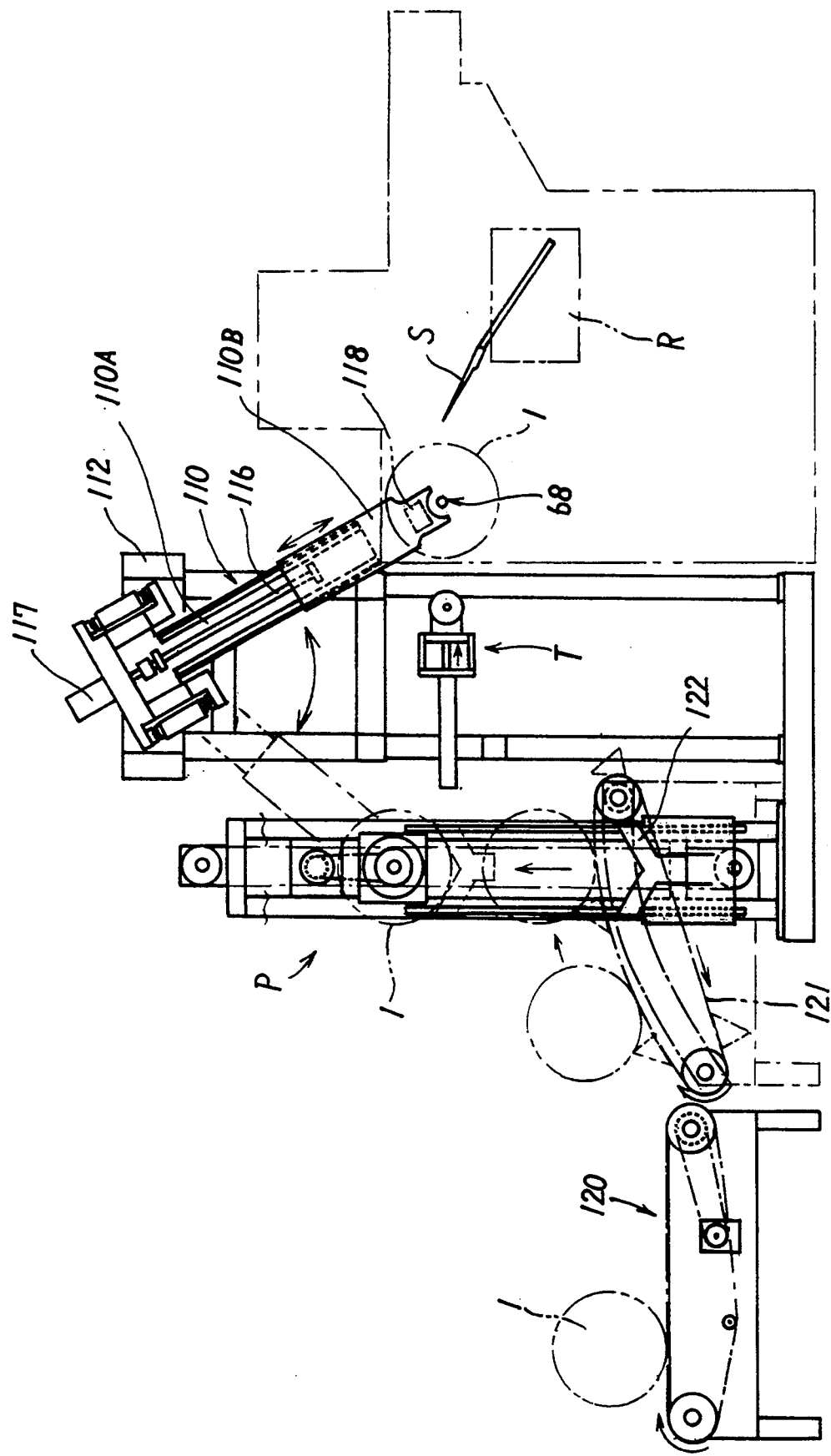
FIG. 27 is a side view of another embodiment.
Figure 28:
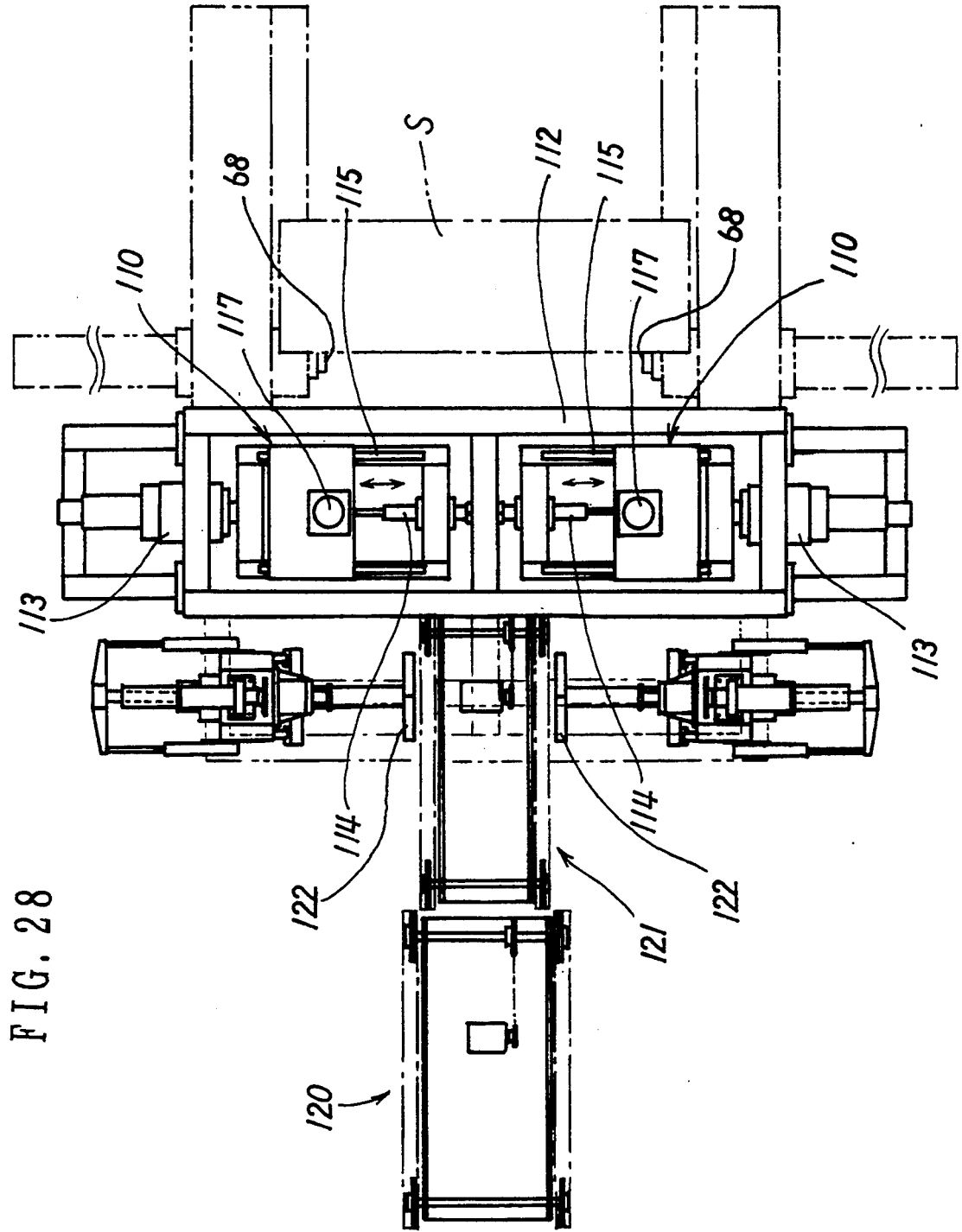
FIG. 28 is a top plan view of FIG. 27.
Figure 29:
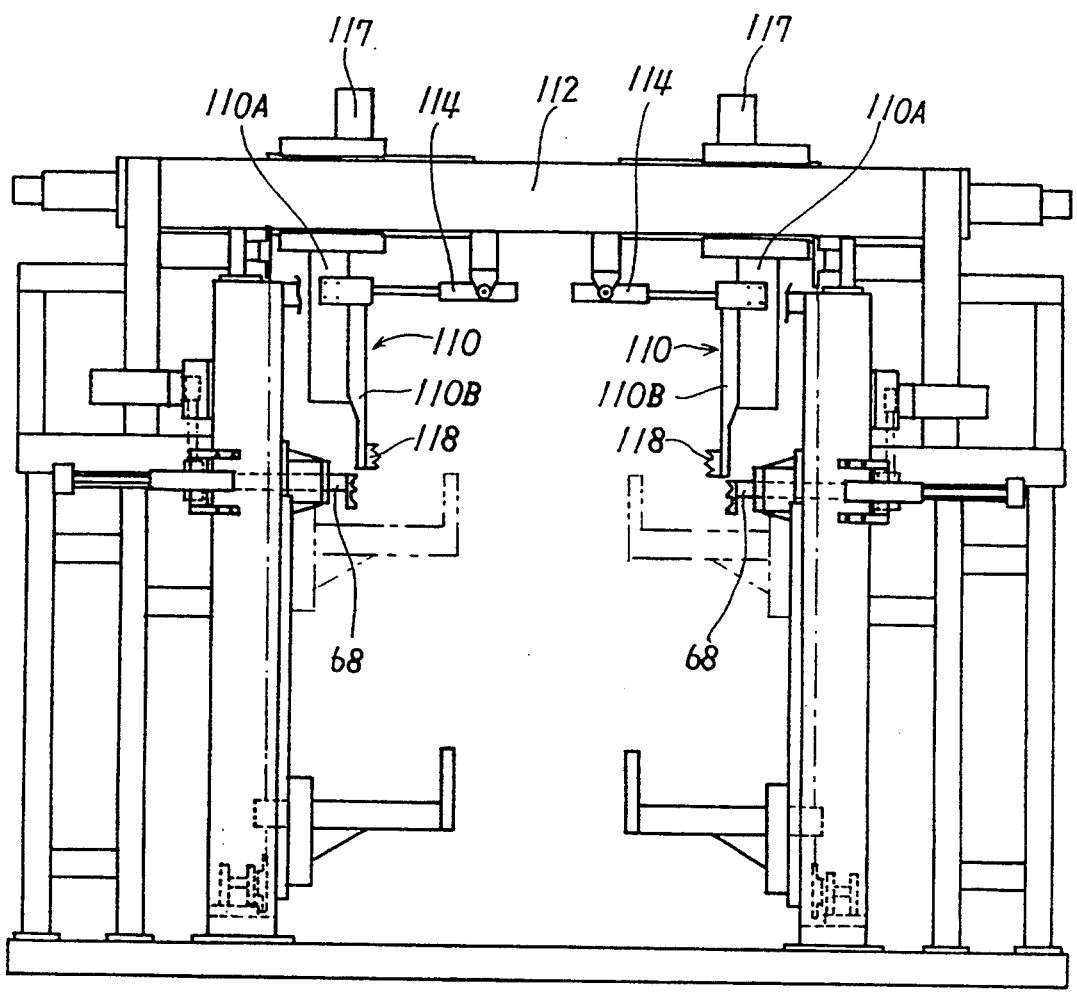
FIG. 29 is a front view of FIG. 27.

Instead of the inclined beams 69, a pair of swing arms 110, for example, those presented in FIG. 27-29, can be used. As shown in FIG. 27, these swing arms 110 are used for transporting the log 1, for which the turning center has been determined at the centering position P, to the spindle 68 of the veneer lathe. They are mounted facing each other with respect to the longitudinal direction of the log 1 so that they can swing independently and move to and from each other. The swing arms 110 are swung with designated angles by respective swing motors 113 in FIG. 28 while they are moved to and from each other by respective cylinders 114 along respective guides 115.

As is shown in FIG. 27, each swing arm 110 comprises a main body 110A which swings around the pivot on the upper part thereof and a extending-retracting portion 110B connected movably along the longitudinal direction thereof. The extending-retracting portion 110B is screwed on the threaded feeding shaft 116. When the motor 117 for extending or retracting the portion 110B rotates the feeding shaft in the normal or reverse direction, the portion 110B is moved with respect to the main body 110A, and the total length of the swing arm 110 is extended or retracted. Furthermore, a claw 118 for transportation is secured on each extending-retracting portion 110B, and the coordinates of the position for each claw 118 are determined by the swing angle $\theta$ from the base position of the swing arm 110 and the length r of the swing arm 110 (i.e., the moving distance of the extending-retracting portion 110B with respect to the main body 111A) in accordance with a polar coordinates system.

The log 1 transported by the log conveyor 120 is further transported by the hook conveyor 121, stopped above the transporter 122, and then brought into the turning position P by the elevation of the transporter 122. The log 1 is held at the virtual center by such pair of holding claws as previously mentioned, and rotated with almost one revolution, and thus the turning center is determined for the log 1. Such procedure is the same as that for the embodiment previously mentioned, so the details are not presented here. In this centering process, contact or non-contact type periphery detectors as shown in FIG. 15 or in FIG. 24 are used, but these periphery detectors are not presented in the FIGS. 27-29 for avoiding complexity.

The log 1 for which the turning center has been determined is held at the upper portions of both end surfaces by the respective transportation claws 118 of the pair of swing arms 110. As is shown in FIG. 27, the pair of swing arms 110 swing toward the side of the spindle 68 of the veneer lathe, while supporting the log 1. At this time, to avoid hitting the log 1 and the backup roller device T, which is located in the opposite side with respect to the turning blade S supported by the planer table R, the swing arm 110 is once retracted (by the rising of the portion 110B). After the log 1 passes over the backup roller device T, the swing arm 110 is extended (by lowering the portion 110B), and the log 1 is positioned to the spindle 68 of the veneer lathe.

The deviation between the virtual center and the turning center should be adjusted by the claws 118 of the swing arm 110. The adjustment can be performed before the swing arms 110 hold the log 1 at the turning position, or during the transportation of the log 1 after the holding. Anyway, said deviation is transformed to the polar coordinates presented by the swing angle $\theta$ of the swing arm 110 and the arm length r thereof (the moving distance of the portion 110B), and the position of respective swing arms 110 and claws 118 are adjusted independently of each other by the motors 113 and 117 so that said deviations are canceled. Other content of the embodiment is the same as that previously mentioned, so the details are not mentioned here.

Figure 30:
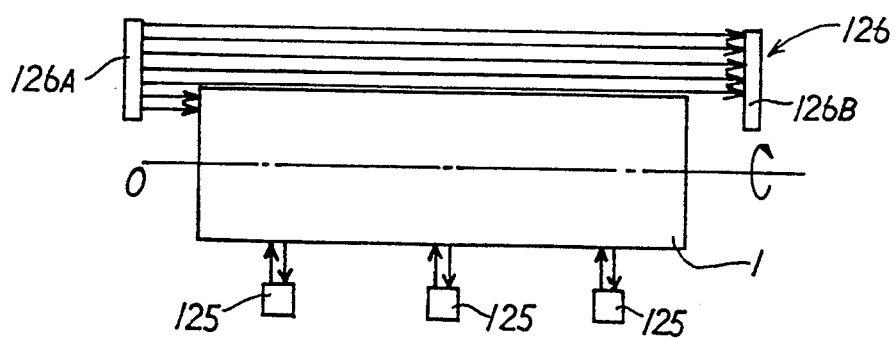
FIG. 30 is a figure explaining a further different embodiment.

As is shown in FIG. 30, when the log 1 is rotated around the virtual center O to determine the turning center, detectors 126 for detecting the largest radius of rotation (such as photoelectric cells, laser begs, electromagnetic wave and ultrasonic waves) are facing each other with respect to the longitudinal direction of the log 1. For example, the largest radius of rotation of the log 1 is determined in such a way that a plurality of light beams aligned in the direction of the height or a light band with a certain width spread along the direction of the height is projected from a light projector 126A toward the outer surface of the log, and the amount of light reaching to the light receiver 126B on the opposite side without being shielded by the outer surface of the log 1 is measured to determine the peripheries of the cross sections of the log 1. The resulting largest radius of rotation is fed back to the stand by position of said planer table R. In this case, for obtaining a plurality of peripheries of the cross sections, it is preferable to arrange the periphery detectors 125 juxtaposed closely along the longitudinal direction of the log 1 or at a designated distance in a proper way.

The embodiments presented above are mere examples of several possibilities so this invention is not limited to the description of these embodiments.

That which is claimed is:

1. A method for centering a log comprising the steps of:

mounting a plurality of detecting elements, which elements cover detecting regions juxtaposed over the total length of the log;

detecting the peripheries of cross sections of said log for respective detecting regions by rotating said log around a virtual temporary center;

determining the largest circles inscribed in the peripheries of a plurality of cross sections;

forecasting the direction of the largest right circular cylinder with respect to the longitudinal direction of said log from the geometrical arrangement of said largest inscribed circles;

determining the center of the largest right circular cylinder which is settled inside all cross sections obtained for said detecting regions according to said forecasted direction and;

adopting said center determined as the anticipated center.

2. A method for supplying a log to be centered comprising the steps of:

mounting a plurality of detecting elements, which elements cover detecting regions juxtaposed over the total length of the log, and correspond to the outer surface of the log;

detecting the peripheries of cross sections of said log for respective said detecting regions by rotating said log around a temporary center;

determining a turning center for said log according to data of two or more of peripherals of cross sections detected;

determining a largest radius of rotation of said log around said turning center according to data of peripheries of cross sections for all detecting regions and;

making the planer table of a veneer lathe standby so that the tip of the turning blade supported by said planer table is held as close to a turning center in the veneer lathe as possible at a distance exceeding said largest radius of rotation.

3. An apparatus for centering a log having ends and a middle comprising;

a pair of rotating holding claws for holding a log at both the ends of its temporary center located on both sides of a passage where logs are transported;

a device for rotating the log around said temporary center by said claws;

a plurality of log periphery detecting elements, which correspond to the outer surface of the log so that their detecting regions are juxtaposed over the total length of the log, for detecting peripheries of cross sections of respective detecting regions in accordance with the rotation of the log;

a calculating means for determining largest circles inscribed in the peripheries of at least two cross sections adjacent to both the ends of said log for forecasting the direction of the largest right circular cylinder with respect to the longitudinal direction of said log from the geometrical arrangement of said largest inscribed circles, and for determining the center of the largest right circular cylinder which fits inside all cross sections obtained for respective detecting regions according to said forecasted direction and;

adopting said center determined as the anticipated center.

4. An apparatus for centering a log according to claim 3, wherein said periphery detecting elements comprise devices for detecting the rotation angle of the log and detecting the periphery of the log according to the distance between said temporary center and the periphery of the log, and said rotation angle.

5. An apparatus for centering a log according to claim 3 wherein said plurality of periphery detectors comprise;
   a plurality of rocking arms which rock and extend toward the outer surface of said log;
   a plurality of contact type detecting elements mounted on respective tips of said rocking arms, wherein each element has an arbitrary length along the longitudinal direction of the log and contacts the outer surface of the log, respectively, and wherein said plurality of detecting elements are juxtaposed in the longitudinal direction of the log and;
   displacement detectors corresponding to said rocking arms for detecting the displacement of said detecting elements which displacement varies in accordance with the peripheries of cross sections of the log during rotation.

6. An apparatus for centering a log according to claim 5;
   wherein the sum of the widths of said rocking arms in the longitudinal direction of the log is smaller, at the portion where said rocking arms are supported pivotally, than that of said detecting elements mounted on respective tips of said arms;
   wherein the pivotal portion for one or more specific rocking arms located at the end of the series of said rocking arms is mounted movably along the longitudinal direction of the log center axis and;
   wherein detecting elements of any rocking arms except for said specific one is withdrawn from the series of the detecting elements juxtaposed, and wherein said specific rocking arm is shifted to a position lose to said log middle.

7. An apparatus for centering a log according to claim 3 wherein said plurality of periphery detecting elements are non-contact type ones using the reflection or interception of propagating medium by the outer surface of the log, selected from the group comprising laser beam, electromagnetic wave and ultrasonic wave.

8. An apparatus for centering and supplying a log comprising;
   a paris of rotating holding claws for holding a log at both the ends of its temporary center located on both sides of a passage where logs are transported;
   a device for rotating the log around said temporary center by said claws;
   a plurality of log periphery detecting elements, which correspond to the outer surface of the log so that their detecting regions are juxtaposed over the total length of the log, for detecting peripheries of cross sections of respective detecting regions in accordance with the rotation of the log;
   a means for calculating a largest radius of rotation of the log according to the data of peripheries of cross sections from all detecting regions;
   a means for detecting a position of a planer table holding a turning blade, which means detects a feeding position of the planer table with respect to the turning center and;
   a means for setting the standby position of the planer tale, which means preliminarily sets a standby position of the planer table so that a tip of the turning blade supported by said planer tale is held as close to a turning center in a veneer lathe as possible at a distance exceeding said largest radius of rotation according to the outputs from said means for detecting the position of the planer table and said means for calculating the largest radius of rotation.

9. An apparatus for entering and supplying a log according to claim 8, wherein said periphery detectors comprise devices for detecting the rotation angle of the log and detecting the periphery of the log according to a distance between a temporary center and a periphery of the log, and said rotation angle.

10. An apparatus for centering and supplying a log according to claim 8 further comprising;
    a pair of transporting members, which are mounted facing each other with respect to the log along the longitudinal direction thereof, transport said log from said pair of holding claws to a veneer lathe with no interference with attachments between said holding claws and said veneer lathe, and set aid log in the veneer lathe so that said turning center of the log agree with a turning center in said veneer lathe;
    a pair of transportation claws which are mounted on respective said transportation members and move independently so that a deviation of the coordinates of said temporary center from those of said turning center is decreased.

11. An apparatus for centering and supplying a log comprising according to claim 10, wherein said pair of transportation claws move independently along two directions intersecting each other.

12. An apparatus for centering and supplying a log according to claim 10, wherein said pair of transporting members are a pair of guide beam members for transporting said log from said pair of holding claws to a veneer lathe, which beam members are mounted facing each other in a longitudinal direction of said log, and in which respective guiding portions are formed along a first direction from said holding claws to the veneer lathe;
    wherein said pair of transportation claws are mounted so that each claw can move independently in an reciprocating motion along respective guiding portions by means of a reciprocating mechanism and can be traversed up and down in a second direction intersecting said first direction by means of an elevating mechanism, and which claws hold the log after the calculation of said turning center in respective positions on both the ends of the log where said holding claws never interfere with said transportation claws, thereby said transportation claws receive the log from said holding claws;
    and further comprising an adjusting means which outputs adjusting amounts for said reciprocating mechanism and said elevating mechanism, respectively, so that a deviation of the coordinates of said temporary center from those of said turning center is decreased before or after said transportation claws hold said log, thereby said pair of transportation claws are adjusted independently.

13. An apparatus for centering and supplying a log according to claim 12, wherein said pair of guide beam members are a pair of inclined beams located in a direction from said pair of holding claws toward said veneer lathe.

14. An apparatus for centering and supplying a log according to claim 12, wherein said plurality of periphery detectors comprise;

a plurality of rocking arms which rock and extend toward the outer surface of said log;

a plurality of contact-type detecting elements mounted on respective tips of said rocking arms, wherein each element has an arbitrary length along the longitudinal direction of the log and contacts the outer surface of the log, respectively, and wherein said plurality of detecting elements are juxtaposed over the total length of the log and;

displacement detectors corresponding to said rocking arms for detecting the displacement of said detecting elements which varies in accordance with the peripheries of cross sections of the log during rotation.

15. An apparatus for centering and supplying a log according to claim 10;

wherein said pair of transporting members are a pair of swing members which are mounted facing each other in the direction of a longitudinal direction of said log for transporting said log from said pair of holding claws to a position of the turning center in a veneer lathe, and can swing independently in a plane intersecting said longitudinal direction of the log by means of a swinging mechanism;

wherein said pair of transportation claws are mounted so that each claw can move independently in a reciprocating motion along the longitudinal direction of said swing members by means of a reciprocating mechanism, and which claws hold the log after the determination of said turning center in respective positions on both the ends of the log whereby said holding claws never interfere with said transportation claws, whereby said transportation claws receive the log from said holding claws;

and further comprising an adjusting means which outputs adjusting amounts for said reciprocating mechanism and said swinging mechanism, respectively, so that the deviation of the coordinates of said temporary center from those of said turning center is decreased before or after said transportation claws hold said log, whereby said pair of transportation claws are adjusted independently.

16. An apparatus for centering and supplying a log according to claim 15, wherein said pair of swing members comprises a main body supported at a pivot of a swinging motion and at least one extending-retracting portion which extends and retracts with respect to said main body and, wherein said respective transportation claws are mounted on said extending-retracting portions.

17. An apparatus for centering and supplying a log according to claim 15, wherein said plurality of periphery detectors comprise;

a plurality of contact type detecting elements mounted on respective tips of said rocking arms, wherein each element has an arbitrary length along the longitudinal direction of the log and contact with an outer surface of the log, and wherein said plurality of elements are juxtaposed almost closely in the longitudinal direction of the log and;

displacement detectors mounted corresponding to said respective rocking arms for detecting the displacement of said detecting elements which displacement varies in accordance with the peripheries of cross sections of the log in rotation.

* * * * *